US012075425B2

(12) United States Patent
Bang et al.

(10) Patent No.: US 12,075,425 B2
(45) Date of Patent: Aug. 27, 2024

(54) METHOD AND DEVICE FOR TRANSMITTING/RECEIVING UPLINK CONTROL INFORMATION IN WIRELESS COMMUNICATION SYSTEM

(71) Applicant: Samsung Electronics Co., Ltd., Suwon-si (KR)

(72) Inventors: Jonghyun Bang, Suwon-si (KR); Jinyoung Oh, Suwon-si (KR); Sungjin Park, Suwon-si (KR); Cheolkyu Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 17/032,822

(22) Filed: Sep. 25, 2020

(65) Prior Publication Data
US 2021/0100024 A1    Apr. 1, 2021

(30) Foreign Application Priority Data
Sep. 27, 2019   (KR) .................. 10-2019-0119946

(51) Int. Cl.
*H04W 72/14*   (2009.01)
*H04L 1/18*    (2023.01)
(Continued)

(52) U.S. Cl.
CPC .......... *H04W 72/23* (2023.01); *H04L 1/1819* (2013.01); *H04L 5/0051* (2013.01);
(Continued)

(58) Field of Classification Search
None
See application file for complete search history.

(56) References Cited

U.S. PATENT DOCUMENTS 8,634,345 B2   1/2014 Yin et al.
9,210,695 B2  12/2015 Kim et al.
(Continued)

FOREIGN PATENT DOCUMENTS

CN   107210870 A   9/2017
CN   107210889 A   9/2017
(Continued)

OTHER PUBLICATIONS

International Search Report dated Jan. 5, 2021, issued in International Application No. PCT/KR2020/013187.
(Continued)

*Primary Examiner* — Steve R Young
(74) *Attorney, Agent, or Firm* — Jefferson IP Law, LLP

(57) ABSTRACT

The disclosure relates to a communication technique for convergence of a 5th generation (5G) communication system for supporting a higher data transmission rate beyond a 4th generation (4G) system with an IoT technology, and a system therefor. The disclosure may be applied to intelligent services (e.g., smart homes, smart buildings, smart cities, smart cars or connected cars, health care, digital education, retail business, security and safety-related services, etc.) on the basis of a 5G communication technology and an IoT-related technology. The disclosure relates to a method and device for transmitting or receiving uplink control information in a wireless communication system. The disclosure relates to a method for configuring and generating uplink control information in an unlicensed band. The disclosure proposes a method for adding generated uplink control information to an uplink data channel.

16 Claims, 22 Drawing Sheets

(51) Int. Cl.
  *H04L 1/1812* (2023.01)
  *H04L 5/00* (2006.01)
  *H04L 5/10* (2006.01)
  *H04W 72/04* (2023.01)
  *H04W 72/12* (2023.01)
  *H04W 72/1263* (2023.01)
  *H04W 72/21* (2023.01)
  *H04W 72/23* (2023.01)
  *H04W 80/08* (2009.01)

(52) U.S. Cl.
  CPC .............. *H04L 5/0055* (2013.01); *H04L 5/10* (2013.01); *H04W 72/1263* (2013.01); *H04W 72/21* (2023.01); *H04W 80/08* (2013.01)

(56) References Cited

U.S. PATENT DOCUMENTS

| | | | |
|---|---|---|---|
| 10,455,525 | B2 | 10/2019 | Yang et al. |
| 10,523,397 | B2 | 12/2019 | Park et al. |
| 2011/0310855 | A1 | 12/2011 | Yin et al. |
| 2013/0039321 | A1 | 2/2013 | Kim et al. |
| 2018/0175973 | A1 | 6/2018 | Rosa et al. |
| 2018/0255544 | A1 | 9/2018 | Xiao |
| 2019/0182825 | A1 | 6/2019 | Koorapaty et al. |
| 2019/0199420 | A1* | 6/2019 | Faxér .................. H04B 7/0639 |
| 2020/0228248 | A1* | 7/2020 | Islam ................... H04L 1/1861 |
| 2021/0007129 | A1* | 1/2021 | Talarico ............ H04W 72/0446 |
| 2021/0051702 | A1* | 2/2021 | Bhattad ................ H04L 1/1854 |
| 2021/0315000 | A1* | 10/2021 | Li .......................... H04L 1/0061 |
| 2022/0174721 | A1* | 6/2022 | Oviedo ................. H04L 5/0053 |
| 2022/0174722 | A1* | 6/2022 | Talarico ................ H04W 72/23 |
| 2022/0200734 | A1* | 6/2022 | Karaki .................. H04L 1/1864 |
| 2022/0217739 | A1* | 7/2022 | Gao ...................... H04L 1/1812 |
| 2022/0407617 | A1* | 12/2022 | Myung ................. H04W 72/21 |
| 2023/0389016 | A1* | 11/2023 | Wu ....................... H04L 1/0072 |

FOREIGN PATENT DOCUMENTS

| | | |
|---|---|---|
| CN | 107743695 A | 2/2018 |
| CN | 109889316 A | 6/2019 |
| CN | 114026813 A | 2/2022 |
| EP | 3 493 606 A1 | 6/2019 |
| KR | 10-2018-0077222 A | 7/2018 |
| WO | 2015/115804 A1 | 8/2015 |
| WO | 2021-003273 A9 | 1/2021 |

OTHER PUBLICATIONS

Extended European Search Report dated Aug. 5, 2022, issued in a counterpart European Application No. 20868635.2.
Qualcomm Incorporated; Enhancement to configured grants in NR unlicensed; 3GPP TSG RAN WG1 Meeting #98; R1-1909248; Aug. 17, 2019.
Chinese Office Action dated Nov. 28, 2023, issued in Chinese Patent Application No. 202080051317.1.
Chinese Office Action dated Apr. 29, 2024, issued in Chinese Patent Application No. 202080051317.1.

* cited by examiner

METHOD AND DEVICE FOR TRANSMITTING/RECEIVING UPLINK CONTROL INFORMATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0119946, filed on Sep. 27, 2019, in the Korean Intellectual Property Office, the disclosure of which is incorporated by reference herein in its entirety.

BACKGROUND

1. Field

The disclosure relates to a wireless communication system. More particularly, the disclosure relates to a method and device for transmitting or receiving uplink control information in a wireless communication system using an unlicensed band.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in higher frequency (millimeter wave (mmWave)) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Research on a method and device for transmitting traffic by using an unlicensed band in a 5G communication system is being conducted.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for transmitting or receiving an uplink control channel in a wireless communication system.

Another aspect of the disclosure is to provide a method performed by a terminal in a communication system includes receiving, from a base station, configuration information on a configured grant for a physical uplink shared channel (PUSCH) by higher layer signaling, the configuration information including an indicator indicating whether to multiplex a hybrid automatic repeat request acknowledgement (HARQ-ACK) information and configured grant-uplink control information (CG-UCI); identifying that a transmission of the HARQ-ACK information overlaps with a PUSCH transmission configured by the configuration information; and transmitting, to the base station, uplink data on the PUSCH configured by the configuration information with the HARQ-ACK information and the CG-UCI, in case that the indicator indicates to multiplex the HARQ-ACK and the CG-UCI.

Another aspect of the disclosure is to provide a method performed by a base station in a communication system includes transmitting, to a terminal, configuration information on a configured grant for a physical uplink shared channel (PUSCH) by higher layer signaling, the configuration information including an indicator indicating whether to multiplex a hybrid automatic repeat request acknowledgement (HARQ-ACK) information and configured grant-uplink control information (CG-UCI); identifying that a reception of the HARQ-ACK information overlaps with a PUSCH reception configured by the configuration information; and receiving, from the terminal, uplink data on the PUSCH configured by the configuration information with the HARQ-ACK information and the CG-UCI, in case that the indicator indicates to multiplex the HARQ-ACK and the CG-UCI.

Another aspect of the disclosure is to provide a terminal in a communication system includes a transceiver; and a processor coupled with the transceiver and configured to: receive, from a base station, configuration information on a configured grant for a physical uplink shared channel (PUSCH) by higher layer signaling, the configuration information including an indicator indicating whether to multiplex a hybrid automatic repeat request acknowledgement (HARQ-ACK) information and configured grant-uplink control information (CG-UCI), identify that a transmission of the HARQ-ACK information overlaps with a PUSCH transmission configured by the configuration information, and transmit, to the base station, uplink data on the PUSCH configured by the configuration information with the HARQ-ACK information and the CG-UCI, in case that the indicator indicates to multiplex the HARQ-ACK and the CG-UCI.

Another aspect of the disclosure is to provide a base station in a communication system includes a transceiver; and a processor coupled with the transceiver and configured to: transmit, to a terminal, configuration information on a configured grant for a physical uplink shared channel (PUSCH) by higher layer signaling, the configuration information including an indicator indicating whether to multiplex a hybrid automatic repeat request acknowledgement (HARQ-ACK) information and configured grant-uplink control information (CG-UCI), identify that a reception of the HARQ-ACK information overlaps with a PUSCH reception configured by the configuration information, and receive, from the terminal, uplink data on the PUSCH configured by the configuration information with the HARQ-ACK information and the CG-UCI, in case that the indicator indicates to multiplex the HARQ-ACK and the CG-UCI.

Additional aspects will be set forth in part in the description which follows and, in part, will be apparent from the description, or may be learned by practice of the presented embodiments.

In accordance with an aspect of the disclosure, the reception efficiency of uplink control information can be improved via a method for including uplink control information in an uplink data channel, in a system and a node which receive a downlink signal or a system and a node which transmit a downlink signal, in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
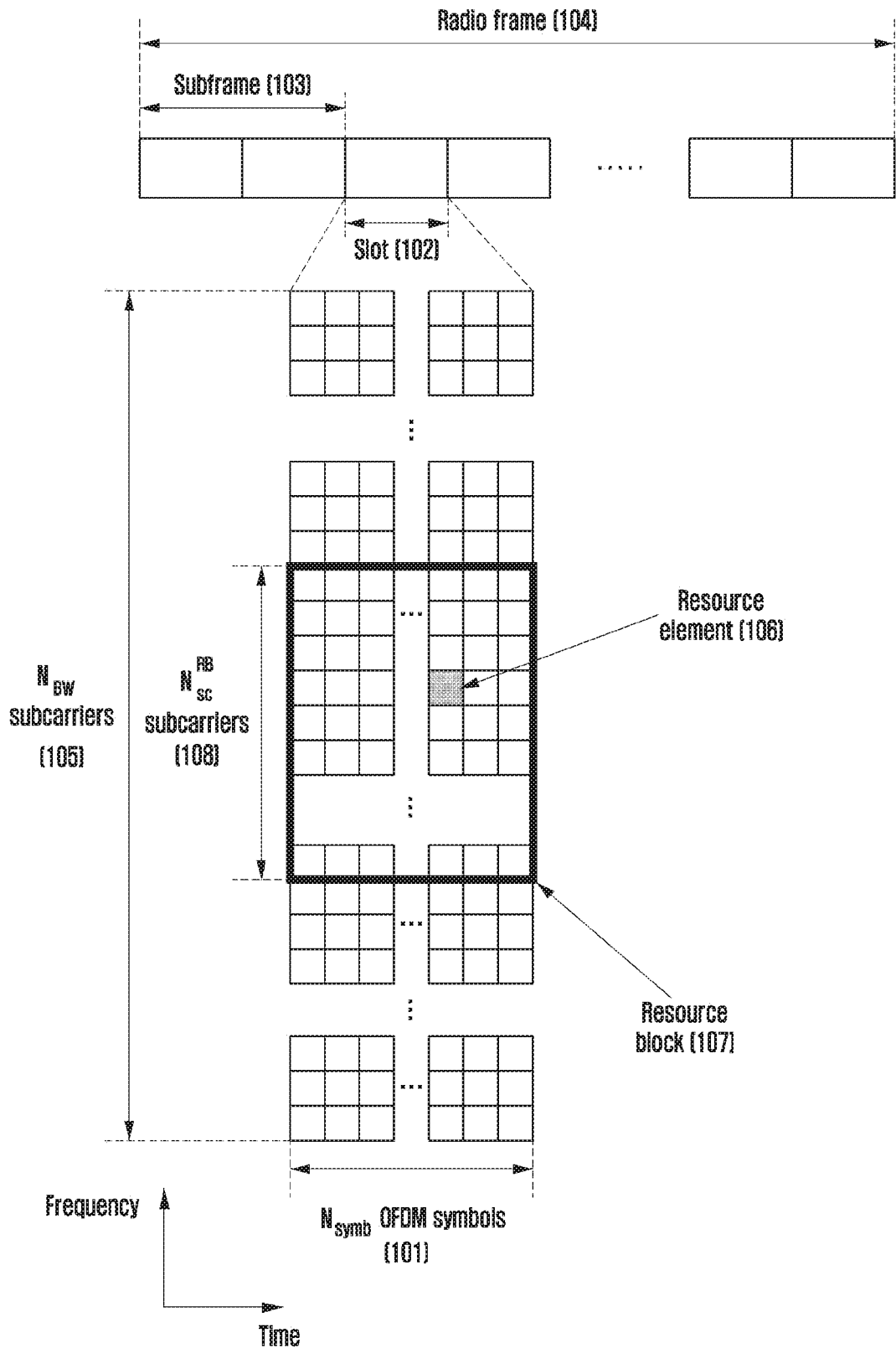
FIG. 1 is a diagram illustrating an uplink/downlink time-frequency domain transmission structure in a new radio (NR) system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more central process units (CPUs) within a device or a security multimedia card. Further, the "unit" in the embodiments may include one or more processors.

It is considered that more various services are supported in a 5G system, compared to the existing a 4G system. For example, most representative services may include an enhanced mobile broadband (eMBB) communication service, an ultra-reliable and low latency communication (URLLC) service, a massive device-to-device communication (massive machine type communication (mMTC)) service, and a next generation broadcast service (evolved multimedia broadcast/multicast service (eMBMS)). A system providing the URLLC service may be referred to as a URLLC system, and a system providing the eMBB service may be referred to as an eMBB system. The terms "service" and "system" may be used interchangeably.

As described above, a plurality of services may be provided to a user in a communication system. In order to provide the plurality of services to a user, a method capable of providing a user with each service according to characteristics within the same time interval and a device using the method are required.

In the case of a 5G communication system, various technologies, such as a technology enabling retransmission in units of code block groups and a technology enabling uplink signal transmission without uplink scheduling information, have been introduced to provide various services and to support a high data rate. Therefore, when a communication device is to perform 5G communication via an unlicensed band, a more efficient channel access procedure in consideration of various parameters is necessary.

A wireless communication system has moved away from providing early voice-oriented services, and advances toward broadband wireless communication systems that provide high-speed and high-quality packet data services, such as communication standards, for example, 3rd generation partnership project (3GPP)'s high speed packet access (HSPA), long term evolution (LTE) or evolved universal terrestrial radio access (E-UTRA), LTE-advanced (LTE-A), 3GPP2's high rate packet data (HRPD), ultra-mobile broadband (UMB), institute of electrical and electronics engineers (IEEE)'s 802.16e, and the like. Further, communication standards for 5G or new radio (NR) are generated on the basis of 5th generation wireless communication system.

Accordingly, in the wireless communication system including 5G, at least one service among enhanced mobile broadband (eMBB), massive machine type communications (mMTC), and ultra-reliable and low-latency communications (URLLC) may be provided to a terminal. The services may be provided to the same terminal during the same time interval. The eMBB may be a service aimed at high speed transmission of high capacity data, the mMTC may be a service aimed at minimizing a terminal electrical power and accessing multiple terminals, and the URLLC may be a service aimed at a high reliability and a low latency. However, the eMBB, the mMTC, and the URLLC are not limited thereto. The three services may be major scenarios in an LTE system or a system, such as 5G/new radio or next radio (NR), beyond LTE.

When a base station schedules data corresponding to the eMBB service to a particular terminal in a specific transmission time interval (TTI), if a situation in which URLLC data should be transmitted in the TTI occurs, the generated URLLC data may be transmitted in a frequency domain, in which the eMBB data has been already scheduled and transmitted, without transmitting a part of the eMBB data in the frequency domain. A UE, for which eMBB has been scheduled, and a UE, for which URLLC has been scheduled, may be the same UE or different UEs. In this case, since the part of the eMBB data, which has already been scheduled and was being transmitted, is not be transmitted, the possibility of damage to the eMBB data increases. Therefore, in the above case, a signal processing method and a method of processing a signal received from the UE, for which eMBB has been scheduled, or the UE, for which URLLC has been scheduled, are required to be determined.

Hereinafter, an embodiment will be described in detail with the accompanying drawings. In description of the disclosure, if it is determined that a detailed description of a related function or configuration unnecessarily obscures a subject matter of the disclosure, the detailed description thereof will be omitted. Terms to be described hereinafter are terms defined in consideration of functions in the disclosure, and may vary depending on intention or usage of users or operators. Therefore, the definition should be based on contents throughout the specification.

Hereinafter, a base station is a subject that performs resource allocation to a terminal, and may include at least one of an evolved Node B (eNode B), a Node B, a base station (BS), a radio access unit, a base station controller, or a node on a network. A terminal may include a user equipment (UE), a mobile station (MS), a cellular phone, a smart phone, a computer, or a multimedia system capable of performing a communication function. In the disclosure, a downlink (DL) is a wireless transmission path of a signal transmitted from a base station to a terminal, and an uplink (UL) refers to a wireless transmission path of a signal transmitted from a terminal to a base station. Although an LTE or LTE-A system may be described as an example hereinafter, embodiments may be applied to other communication systems having a similar technical background or channel form. For example, a 5th generation mobile communication technology (5G and new radio (NR)) to be developed after LTE-A may be included. Further, embodiments may be applied to other communication systems via some modifications without departing from the scope of the disclosure, according to determination by those skilled in the art.

As a representative example of the broadband wireless communication system, an NR system employs an orthogonal frequency division multiplexing (OFDM) scheme in a downlink (DL), and employs both OFDM and single carrier frequency division multiple access (SC-FDMA) schemes in an uplink (UL). Uplink refers to a radio link, via which a terminal (or user equipment (UE)) or a mobile station (MS) transmits data or a control signal to a base station (BS or eNode B), and downlink refers to a radio link, via which a base station transmits data or a control signal to a terminal. In such a multiple access scheme, in general, data or control information of each user may be distinguished by assigning and operating time-frequency resources, at which data or control information of each user is transmitted, so as not to overlap each other, that is, to establish orthogonality.

The NR system adopts a hybrid automatic repeat request (HARQ) scheme in which corresponding data is retransmitted in a physical layer when a decoding failure occurs in initial transmission. In the HARQ scheme, when a receiver fails to correctly decode the data, the receiver transmits negative acknowledgement (NACK) informing a transmitter of a decoding failure by the receiver so as to enable the transmitter to retransmit the data in a physical layer. A receiver improves data reception performance, by combining data, which is retransmitted by a transmitter, with the data for which decoding has failed previously. Further, when the receiver correctly decodes the data, the receiver may transmit information (acknowledgment (ACK)) indicating a success of decoding to the transmitter, so as to allow the transmitter to transmit new data.

FIG. 1 is a diagram illustrating a basic structure of a time-frequency domain that is a radio resource area in which the data or a control channel is transmitted in an uplink or a downlink of the NR system or a similar system according to an embodiment of the disclosure.

Referring to FIG. 1, a horizontal axis represents a time domain and a vertical axis represents a frequency domain. A minimum transmission unit in the time domain is an OFDM or a discrete Fourier transform (DFT)-spread (s)-OFDM symbol, and the $N_{symb}$ 101 number of OFDM or DFT-s-OFDM symbols are gathered to form one slot 102. The OFDM symbol is a symbol used when a signal is transmitted or received using an OFDM multiplexing scheme, and the DFT-s-OFDM symbol represents a symbol used when a signal is transmitted or received using DFT-s-OFDM or SC-FDMA multiplexing. Hereinafter, in the disclosure, for the convenience of explanation, OFDM and DFT-s-OFDM symbols will be commonly used as OFDM symbols without distinction, and descriptions will be provided based on downlink signal transmission/reception. However, such usage may also be applicable to uplink signal transmission and reception.

If an interval between subcarriers is 15 kHz, one slot is taken to form one subframe 103, and the length of each of the slot and subframe is 1 ms. The number of slots constituting one subframe 103 and the length of the slots may vary according to an interval between subcarriers. For example, when the interval between subcarriers is 30 kHz, four slots may be gathered to form one subframe 103. The length of the slot is 0.5 ms and the length of the subframe is 1 ms. A radio frame 104 is a time domain section including 10 subframes. A minimum transmission unit in the frequency domain is a subcarrier, and a bandwidth of the entire system transmission bandwidth may include a total of the New 105 number of subcarriers. Such specific values may be applied variably. For example, in the case of an LTE system, an interval between subcarriers is 15 kHz, but two slots are gathered to form one subframe 103, wherein the length of the slot is 0.5 ms and the length of the subframe is 1 ms.

A basic unit of a resource in the time-frequency domain is a resource element (RE) 106, which may be represented by an OFDM symbol index and a subcarrier index. A resource block 107 (RB or physical resource block (PRB)) may be defined by $N_{symb}$ 101 consecutive OFDM symbols in the time domain and $N_{SC}^{RB}$ 108 consecutive subcarriers in the frequency domain. Accordingly, one RB 107 in one slot may include $N_{symb} \times N_{SC}^{RB}$ REs. In general, a minimum allocation unit in the frequency domain of data is the RB 107. In an NR system, in general, $N_{symb}=14$ and $N_{SC}^{RB}=12$, where the number ($N_{RB}$) of RBs may vary according to a bandwidth of a system transmission band. In an LTE system, in general, $N_{symb}=7$ and $N_{SC}^{RB}=12$, and the $N_{RB}$ may vary according to a bandwidth of a system transmission band.

In a wireless communication system, such as an LTE system, an LTE-advanced (LTE-A) system, or a 5G new radio (NR) system, the system may be configured such that a base station transmits downlink control information (DCI) including resource allocation information for transmission of a downlink signal which is transmitted to a UE by the base station via a downlink control channel (physical downlink control channel (PDCCH)), and the UE receives at least one downlink signal of the downlink control information (e.g., a channel-state information reference signal (CSI-RS)), a broadcast channel (physical broadcast channel (PBCH), or a downlink data channel (physical downlink shared channel (PDSCH)). For example, the base station may transmit, in subframe n, downlink control information (DCI) indicating to receive PDSCH in subframe n via PDCCH to the UE, and the UE having received the downlink control information (DCI) may receive PDSCH in subframe n according to the received downlink control information.

The LTE, LTE-A, or NR system, may be configured such that a base station transmits downlink control information (DCI) including uplink resource allocation information to a UE via a downlink control channel (PDCCH), and the UE transmits, to the base station, at least one uplink signal of uplink control information (e.g., a sounding reference signal (SRS), an uplink control information (UCI), or a physical random access channel (PRACH)), or an uplink data channel (physical uplink shared channel (PUSCH)). For example, the UE having received, in subframe n, configuration information (or uplink DCI or UL grant) for uplink transmission performed via PDCCH from the base station may perform uplink data channel transmission (hereinafter, PUSCH transmission) according to a predefined time (e.g., n+4), a time (e.g., n+k) configured via a higher signal, or uplink signal transmission time indicator information (e.g., n+k) that is included in the configuration information for uplink transmission.

The downlink control information may be transmitted within the first N number of OFDM symbols in the subframe. In general, N may be {1, 2, and 3}, and the UE may receive a configured number of symbols, in which downlink control information may be transmitted via a higher signal, from the base station. According to the amount of control information to be transmitted in a current slot, the base station may change, for each slot, the number of symbols in which the downlink control information may be transmitted in the slot, and may transfer information on the number of symbols to the UE via a separate downlink control channel.

In the NR or LTE system, DCI is defined according to various formats, and it may be determined, according to each format, whether the DCI is scheduling information (UL grant) for uplink data or scheduling information (DL grant) for downlink data, whether the DCI is compact DCI having control information of a small size, whether the control information of the DCI indicates fall-back DCI, whether spatial multiplexing using multiple antennas is applied, or whether the DCI corresponds to DCI for power control. For example, a DCI format (e.g., DCI format 1_0 of NR), which corresponds to scheduling control information (DL grant) for downlink data may include at least one of the following control information.

Control information identifier (DCI format identifier): An identifier for identification of a format of received DCI Frequency resource allocation (frequency domain resource assignment): Indicating an RB allocated for data transmission Time domain resource allocation (time domain resource assignment): Indicating a slot and a symbol allocated for data transmission Virtual resource block (VRB)-to-PRB mapping: Indicating whether to apply a VRB mapping scheme Modulation and coding scheme (MCS): Indicating a modulation scheme used for data transmission and a size of a transport block that is data to be transmitted New data indicator: Indicating whether transmission is HARQ initial transmission or retransmission Redundancy version: Indicating a redundancy version of HARQ HARQ process number: Indicating a process number of HARQ PDSCH allocation information (downlink assignment index): Indicating, to a UE, the number of PDSCH reception results to be reported to a base station (for example, the number of HARQ-ACKs)

Transmission power control (TPC) command for physical uplink control channel (PUCCH): Indicating a transmission power control command for PUCCH that is an uplink control channel PUCCH resource indicator: Indicating a PUCCH resource used for an HARQ-ACK report including a reception result for PDSCH configured based on corresponding DCI PUCCH transmission timing indicator (PDSCH-to-HARQ_feedback timing indicator): Indicating information of a slot or symbol, in which a PUCCH for an HARQ-ACK report including a reception result for a PDSCH configured based on corresponding DCI should be transmitted The DCI may be transmitted on a physical downlink control channel (PDCCH) (or control information, hereinafter, used interchangeably) or an enhanced PDCCH (EPDCCH) (or enhanced control information, hereinafter, used interchangeably), which is a downlink physical control channel, via a channel coding and modulation process.

In general, DCI is independently scrambled with a specific radio network temporary identifier (RNTI) (or a terminal identifier, C-RNTI) for each terminal, has a cyclic redundancy check (CRC) added thereto, is channel-coded, and then is configured to each independent PDCCH so as to be transmitted. In the time domain, PDCCH is mapped and transmitted during the control channel transmission period. A mapping location of PDCCH in the frequency domain may be determined by an identifier (ID) of each UE, and may be transmitted in the entire system transmission band.

Downlink data may be transmitted on a physical downlink shared channel (PDSCH) that is a physical channel for downlink data transmission. PDSCH may be transmitted after the control channel transmission interval, and scheduling information, such as a specific mapping location, a modulation scheme, etc. in the frequency domain, is determined based on DCI transmitted via the PDCCH.

Via MCS in control information constituting the DCI, the base station notifies the UE of a modulation scheme applied to PDSCH to be transmitted and the size of data to be transmitted (transport block size, TBS). The MCS may include 5 bits or more, or fewer than 5 bits. The TBS corresponds to a size of a transport block (TB) before channel coding for error correction is applied to a data TB to be transmitted by the base station.

Modulation schemes supported by the NR system are quadrature phase shift keying (QPSK), 16 quadrature amplitude modulation (QAM), 64QAM, and 256QAM, which correspond to modulation orders ($Q_m$) of 2, 4, and 6, respectively. That is, 2 bits per symbol for QPSK modulation, 4 bits per symbol for 16QAM modulation, 6 bits per symbol for 64QAM modulation, and 8 bits per symbol for 256QAM modulation may be transmitted. Further, a modulation scheme of 256QAM or greater may be used according to system modification.

In the NR system, an uplink/downlink HARQ employs an asynchronous HARQ scheme in which a data retransmission time is not fixed. For example, in the case of downlink, when HARQ NACK feedback for initial transmission data transmitted by the base station is received from the UE, the base station freely determines a transmission time of retransmission data by a scheduling operation. The UE may buffer data determined to have an error, according to a result of decoding the received data for an HARQ operation, and then may combine the buffered data with the data retransmitted from the base station. HARQ ACK/NACK information of PDSCH transmitted in subframe n-k may be transmitted from the UE to the base station via PUCCH or PUSCH in subframe n.

In the case of the 5G communication system such as NR, value k may be transmitted while being included in DCI for indication or scheduling of reception of the PDSCH transmitted in subframe n-k, or may be configured for the UE via higher layer signaling. The base station may configure one or more k values via a higher signal and is able to indicate a specific k value on the basis of DCI. The value k may be determined according to HARQ-ACK processing capability of the UE, that is, a minimum time required for the UE to receive PDSCH and generate and report an HARQ-ACK for the PDSCH. The UE may use a default value or a predefined value, as the value of k, before the value of k is configured.

The descriptions have been provided based on the NR system in order to describe the wireless communication system and the method and device proposed in embodiments of the disclosure. However, the contents of the disclosure are not limited to the NR system, and may be applied to various radio communication systems, such as LTE, LTE-A, LTE-A-Pro, and 5G. The contents of the disclosure describe a system and a device that transmit or receive signals by using an unlicensed band, but the disclosure may be applicable to a system operating in a licensed band.

Hereinafter, in the disclosure, higher layer signaling or a higher signal may correspond to a method for transferring a signal from the base station to the UE by using a downlink data channel of a physical layer, or for transferring a signal from the UE to the base station by using an uplink data channel of a physical layer, wherein the method includes at least one of radio resource control (RRC) signaling, packet data convergence protocol (PDCP) signaling, or a method for transferring a signal via a medium access control (MAC) control element (MAC CE). The higher layer signaling or higher signal may include system information, for example, a system information block (SIB), which is commonly transmitted to a plurality of UEs.

In the case of a system that performs communication in an unlicensed band, a transmission device (a base station or a UE) that is to transmit a signal via the unlicensed band may perform a channel access procedure (or listen-before-talk (LBT)) with respect to the unlicensed band, in which communication is to be performed before transmitting the signal, and in a case where the unlicensed band is determined to be idle, the transmission device may access the unlicensed band and perform signal transmission, according to the channel access procedure. If it is determined, according to the performed channel access procedure, that the unlicensed band is not idle, the transmission device may not be able to perform signal transmission.

The channel access procedure in the unlicensed band may generally include: measuring, by the transmission device, an intensity of a signal received via the unlicensed band for a fixed time or a time period (e.g., a time calculated on the basis of at least one random value selected by the base station or the UE) calculated according to a predefined rule; and comparing the measured intensity of the received signal with a predefined threshold value or a threshold value calculated according to a function to determine the magnitude of the intensity of the received signal, which is configured by at least one parameter of a channel bandwidth or a signal bandwidth, in which a signal to be transmitted is transmitted, and/or the magnitude of an intensity of transmission power, thereby determining the idle state of the unlicensed band.

For example, the transmission device may measure an intensity of the signal during Xus (e.g., 25 us) immediately before a time at which the signal is to be transmitted, and if the measured intensity of the signal has a value smaller than a predefined or calculated threshold value T (e.g., −72 dBm), the transmission device may determine that the unlicensed band is in an idle state and may transmit the configured signal. After the channel access procedure, a maximum time available for continuous signal transmission may be restricted according to a maximum channel occupancy time defined for each country, region, and frequency band according to each unlicensed band, and may also be restricted according to a transmission device type (e.g., a base station or a UE, or a master device or a slave device). For example, in the case of Japan, in an unlicensed band of 5 GHz, with respect to the unlicensed band determined to be in the idle state, a base station or a UE may perform a channel access procedure, and then may occupy the channel for up to 4 ms without performing an additional channel access procedure and transmit a signal.

When the base station or the UE is to transmit a downlink or uplink signal in the unlicensed band, a channel access procedure which can be performed by the base station or the UE may be classified into at least the following types:

Type 1: After performing a channel access procedure for a variable time period, performing uplink/downlink signal transmission Type 2: After performing a channel access procedure for a fixed time period, performing uplink/downlink signal transmission Type 3: Performing uplink or downlink signal transmission without performing a channel access procedure Hereinafter, in the disclosure, descriptions will be provided using both a case where a base station transmits a downlink signal to a UE via an unlicensed band and a case where a UE transmits an uplink signal to a base station via an unlicensed band. However, the content proposed in the disclosure can be also applied, in the same manner, to a case where a UE transmits an uplink signal to a base station via an unlicensed band or a case where a base station transmits a downlink signal to a UE via an unlicensed band, or can be partially modified and applied. Therefore, a detailed description of transmission or reception of a downlink signal will be omitted. In the disclosure, it is assumed that one piece of downlink data information (codeword or TB) or uplink data information is transmitted or received between a base station and a UE. The content proposed in the disclosure may also be applicable to a case where a base station transmits downlink signals to a plurality of UEs or a case where a plurality of codewords or TBs are transmitted or received between a base station and a UE.

A transmitting node (hereinafter referred to as a base station or a UE) which is to transmit a signal via an unlicensed band may determine a scheme for a channel access procedure according to a type of a signal to be transmitted. For example, when a base station is to transmit a downlink signal including a downlink data channel via an unlicensed band, the base station may perform a channel access procedure of type 1. When the base station is to transmit a downlink signal that does not include a downlink data channel via an unlicensed band, for example, when the base station is to transmit a synchronization signal or a downlink control channel, the base station may perform a channel access procedure of type 2 and transmit the downlink signal.

In this case, a scheme of the channel access procedure may be determined according to a transmission length of a signal to be transmitted via the unlicensed band or a length of an interval or time used by occupying the unlicensed band. In general, in a type 1 scheme, a channel access procedure may be performed for a longer time compared with a channel access procedure performed in a type 2 scheme. Therefore, when the transmission node is to transmit a signal for a short time interval or a time period equal to or less than a reference time (e.g., Xms or Y symbol), the type 2 channel access procedure may be performed. On the other hand, when the transmission node is to transmit a signal for a long time interval or a time period equal to or longer than a reference time (e.g., Xms or Y symbol), the channel access procedure of type 1 may be performed. In other words, channel access procedures of different schemes may be performed according to a usage time of the unlicensed band.

If the transmission node performs the channel access procedure of type 1 according to at least one of the described criteria, the transmission node may determine a channel access priority class according to a quality of service class identifier (QCI) of a signal to be transmitted via the unlicensed band, and may perform the channel access procedure by using at least one value among predefined values shown in Table 1 with respect to the determined channel access priority class. For example, QCI 1, 2, and 4 refer to QCI values for services, such as a conversational voice, a conversational video (live streaming), and a non-conversational video (buffered streaming), respectively. When a transmission node is to transmit, to an unlicensed band, a signal for a service that does not match the QCI in Table 1, the transmission node may select the service and a QCI closest to the QCI of Table 1, and may select a channel access priority class therefor.

Table 1 shows mapping relationships between channel access priority classes and QCI.

TABLE 1

| Channel Access Priority | QCI |
| --- | --- |
| 1 | 1, 3, 5, 65, 66, 69, 70 |
| 2 | 2, 7 |
| 3 | 4, 6, 8, 9 |
| 4 | — |

For example, a defer duration, a contention window value or size set ($CW_p$), a minimum and a maximum value ($CW_{min,p}$, $CW_{max,p}$) of the contention window, a maximum channel occupancy available period ($T_{mcot,p}$), etc., which are according to the determined channel access priority (p), may be determined based on Table 2. In other words, a base station that is to transmit a downlink signal via an unlicensed band performs a channel access procedure for the unlicensed band for a minimum duration of $T_f + m_p * T_{sl}$. If the base station is to perform the channel access procedure with channel access priority class 3 (p=3), the size ($T_f + m_p * T_{sl}$) of the defer duration required to perform the channel access procedure is configured using $m_p = 3$. If the unlicensed band is determined to be idle in all of $m_p * T_{sl}$ times, N=N−1 may be true. N may be selected as any integer value between 0 and a value ($CW_p$) of the contention window at a point in time when the channel access procedure is performed. In the case of channel access priority class 3, a minimum contention window value and a maximum contention window value are 15 and 63, respectively. If the unlicensed band is determined to be idle in the defer duration and a duration in which an additional channel access procedure is performed, the base station may transmit a signal via the unlicensed band for a $T_{mcot,p}$ time period (8 ms).

Table 2 is a table showing a channel access priority class in a downlink. In the disclosure, for the convenience of description, descriptions will be provided using a downlink channel access priority class. However, in the case of an uplink, the channel access priority class of Table 2 may be reused, or a channel access priority class for unlink transmission may be defined and used.

TABLE 2

| Channel Access Priority (p) | $m_p$ | $CW_{min,p}$ | $CW_{max,p}$ | $T_{m\,cot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

An initial contention window value ($CW_p$) is a minimum value ($CW_{min,p}$) of the contention window. The base station that has selected value N may perform the channel access procedure in interval $T_{sl}$, and when the unlicensed band is determined to be idle via the channel access procedure performed in interval $T_{sl}$, the value is changed so as to be N=N−1, and when N=0, a signal may be transmitted via the unlicensed band for up to $T_{mcot,p}$ time period. If it is determined, via the channel access procedure at $T_{sl}$ time, that the unlicensed band is not idle, the base station may perform the channel access procedure again without changing value N.

A value of the contention window ($CW_p$) may be changed based on a reception result for a downlink data channel transmitted in a reference slot or a reference subframe in a most recent transmission period (or MCOT), in which a downlink signal has been transmitted via the unlicensed band, at a point in time where the base station initiates the channel access procedure, a point in time where the base station selects value N to perform the channel connection procedure, or immediately therebefore. In other words, the base station may receive a report on a result of reception, by the UE, of downlink data transmitted in the reference subframe or the reference slot, and may increase or minimize the size of $CW_p$ according to an NACK ratio (Z) in the received reception result.

Figure 2:
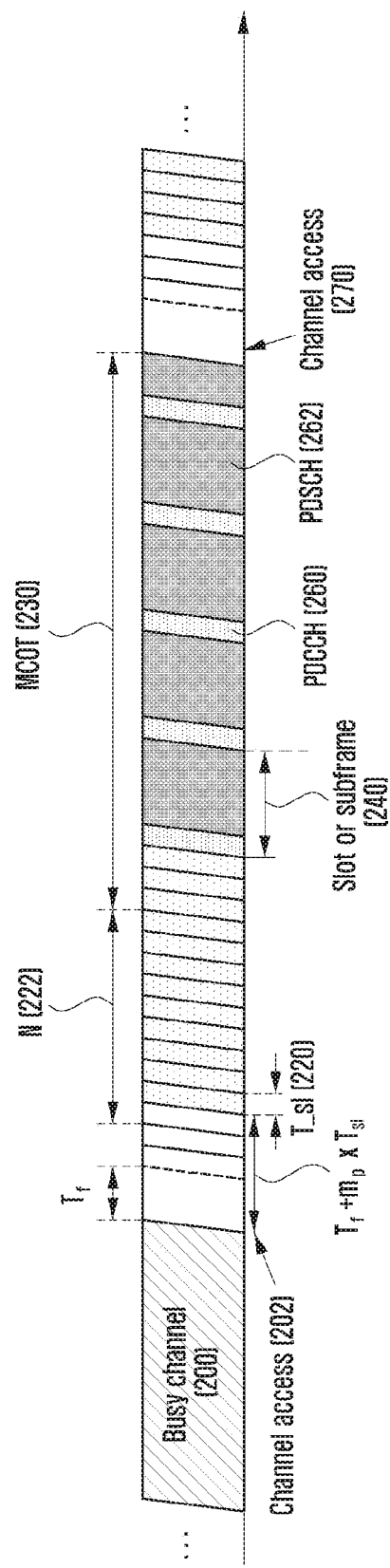
FIG. 2 is a diagram illustrating a channel access procedure in an unlicensed band according to an embodiment of the disclosure.

FIG. 2 is a diagram illustrating a channel access procedure in an unlicensed band according to an embodiment of the disclosure.

Referring to FIG. 2, at a point in time 270 when the base station initiates the channel access procedure, a point in time when the base station selects value N 222 to perform the channel access procedure, or immediately therebefore, a first transmission period 240 of a most recent transmission period 230, in which a downlink signal has been transmitted via the unlicensed band, becomes a contention window change reference slot for the channel access procedure 270. If the base station is unable to receive a report of a reception result for the downlink data channel transmitted in the first slot 240 (hereinafter, slot or subframe) of the transmission period 230 (e.g., if a time interval between the first subframe and the point in time 270 when the base station initiates the channel access procedure is equal to or less than n slots subframes, in other words, if the base station initiates the channel access procedure before the time when the UE may report the reception result of the downlink data channel with respect to the first subframe 240), a first subframe of a most recent transmission period, in which the downlink signal has been transmitted, before the downlink signal transmission period 230 becomes the reference subframe.

In other words, if the base station is unable to receive, from the UE, the reception result for the downlink data transmitted in the reference subframe 240 at the point in time 270 when the base station initiates the channel access procedure, the point in time when value N is selected, or immediately therebefore, the base station may determine, as the reference subframe, a first subframe of the most recent transmission period, in which the downlink signal has been transmitted, from among reception results for the downlink data channel, which are received from UEs. The base station may determine a size of the contention window used for the channel access procedure 270, by using the downlink data reception results received from the UEs with respect to the downlink data transmitted via the downlink data channel in the reference subframe.

For example, the base station having transmitted a downlink signal via the channel access procedure (e.g., $CW_p$=15) according to channel access priority class 3 (p=3) may increase the contention window from a default value ($CW_p$=15) to a next contention window value ($CW_p$=31), if 80% or more of reception results of the UE with respect to the downlink data transmitted to the UE via the downlink data channel in the first subframe, from among downlink signals transmitted via the unlicensed band, is determined to be NACK.

If it is not determined that 80% or more of the reception results is NACK, the base station may maintain an existing value as a value of the contention window or may change the value of the contention window to the default value. In this case, the change of the contention window may be commonly applied to all channel access priority classes or may be applied to only a channel access priority class used for the channel access procedure. A method for determining a reception result valid for determining a change in the size of the contention window, from among the reception results for the downlink data that is transmitted or reported to the base station by the UE with respect to the downlink data transmitted via the downlink data channel in the reference subframe or the reference slot, in which the change in the size of the contention window is determined (i.e., a method for determining the value Z) is as follows.

If the base station transmits one or more codewords or TBs to one or more UEs in the reference subframe or the reference slot, the base station may determine value Z on the basis of a ratio of NACK in the reception results that are transmitted or reported by the UE with respect to the TBs received in the reference subframe or the reference slot. For example, when two codewords and two TBs are transmitted to one UE in the reference subframe or the reference slot, the UE may transmit or report reception results of downlink data signals for the two TBs to the base station. If the ratio Z of NACK in the two reception results is equal to or greater than a threshold value (e.g., Z=80%) predefined or configured between the base station and the UE, the base station may change or increase the size of the contention window.

If the UE bundles the reception results of the downlink data for one or more subframes (e.g., M subframes) including the reference subframe or slot, and transmits or reports the bundled reception results to the base station, the base station may determine that the UE has transmitted M reception results. Further, the base station may determine value Z on the basis of the ratio of NACK among the M received results, and may change, maintain, or initialize the size of the contention window.

If the reference subframe corresponds to a second of the two slots constituting one subframe, value Z may be determined based on the NACK ratio in the reception results transmitted or reported to the base station by the UE with respect to the downlink data received in the reference subframe (that is, the second slot) and a subsequent subframe.

In a case where scheduling information or downlink control information for the downlink data channel transmitted by the base station is transmitted in the same cell or frequency band as that in which the downlink data channel is transmitted, or in a case where the scheduling information or downlink control information for the downlink data channel transmitted by the base station is transmitted via an unlicensed band, but is transmitted in a cell or frequency band different from that in which the downlink data channel is transmitted, if it is determined that the UE has not transmitted the reception results for the downlink data received in the reference subframe or the reference slot, and if a specific reception result among the reception results for the downlink data, which are transmitted by the UE, is determined to be DTX (a state indicating that PDSCH reception has not been performed), NACK/DTX, or any state, the base station may determine value Z by determining the specific reception result of the UE to be NACK.

In the case where the scheduling information or downlink control information for the downlink data channel transmitted by the base station is transmitted via a licensed band, if the specific reception result among the reception results for the downlink data, which are transmitted by the UE, is determined to be DTX, NACK/DTX, or any state, the base station may not include the specific reception result of the UE in reference value Z of the contention window variation. In other words, the base station may determine value Z while disregarding the reception result of the UE.

In a case where the base station transmits the scheduling information or downlink control information for the downlink data channel via a licensed band, if the UE actually has not transmitted downlink data (no transmission), which is indicated in the downlink data reception results for the reference subframe or the reference slot, which are transmitted or reported to the base station by the UE, the base station may determine value Z for the downlink data while disregarding the reception results transmitted or reported by the UE.

In the 5G system, a frame structure needs to be defined and operated flexibly by considering various services and requirements. For example, it may be considered that each service has a different subcarrier spacing according to requirements. The current 5G communication system supports a plurality of subcarrier spacing, and a subcarrier spacing may be determined using Equation 1 as follows.

$$\Delta f = f_0 2^m \qquad \text{Equation 1}$$

Here, $f_0$ denotes basic subcarrier spacing of the system, and m denotes an integer scaling factor. For example, if it is assumed that $f_0$ is 15 kHz, a set of subcarrier spacing that the 5G communication system may have may include 3.75 kHz, 7.5 kHz, 15 kHz, 30 kHz, 60 kHz, 120 kHz, 240 kHz, 480 kHz, and the like. An available subcarrier spacing set may be different depending on frequency bands. For example, 3.75 kHz, 7.5 kHz, 15 kHz, 30 kHz, and 60 kHz may be used in a frequency band below 6 GHz, and 60 kHz, 120 kHz, and 240 kHz may be used in a frequency band above 6 GHz.

A length of an OFDM symbol may vary according to subcarrier spacing constituting the OFDM symbol. This is because, based on characteristics of the OFDM symbol, subcarrier spacing and the length of the OFDM symbol have an inverse relationship with each other. For example, if the subcarrier spacing is doubled, the symbol length is shortened by half and, conversely, if the subcarrier spacing is reduced to ½, the symbol length is doubled.

In the following, a resource area in which a data channel is transmitted in the 5G communication system will be described.

Figure 3:
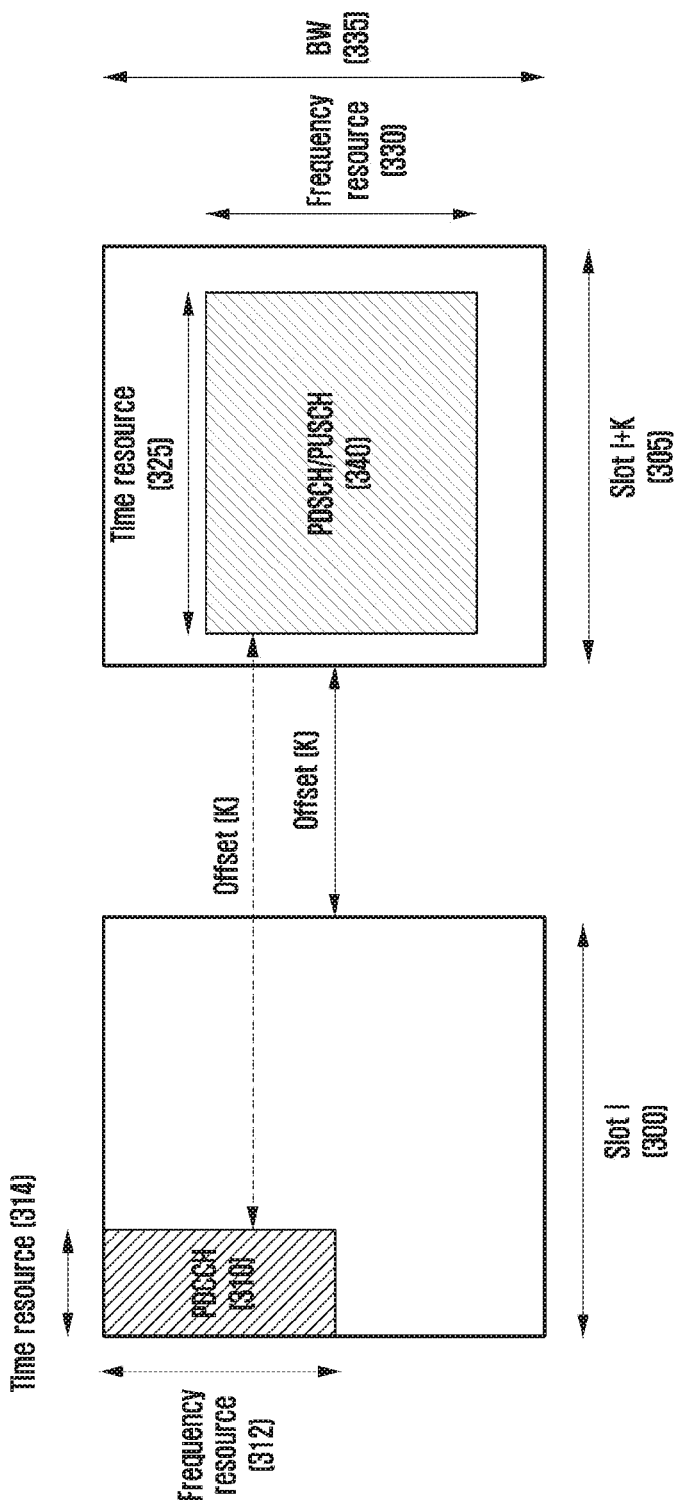
FIG. 3 is a diagram illustrating a resource area and a method of downlink or uplink scheduling in the NR system according to an embodiment of the disclosure.

FIG. 3 is a diagram illustrating a resource area in which a data channel is transmitted in the 5G communication system according to an embodiment of the disclosure.

Referring to FIG. 3, a UE may monitor and/or search for PDCCH 310 in a downlink control channel (hereinafter, PDCCH) area (hereinafter, control resource set (CORESET) or search space (SS)) configured via a higher signal from a base station. The downlink control channel area may include information on a time domain 314 and information on a frequency domain 312, and time domain 314 information may be configured in symbol units and frequency area 312 information may be configured in units of RBs or RB groups. If the UE detects PDCCH 310 in slot i 300, the UE may acquire downlink control information (DCI) transmitted via the detected PDCCH 310. the UE may acquire scheduling information for a downlink data channel or scheduling information for an uplink data channel based on the received downlink control information (DCI). The DCI may at least include information of a resource area (or a PDSCH transmission area) in which the UE should receive the downlink data channel (hereinafter, PDSCH) from the base station, or information of a resource area which is allocated by the base station to the UE for uplink data channel (PUSCH) transmission.

A case where the UE is scheduled for uplink data channel (PUSCH) transmission will be described below. The UE having received the DCI may acquire, on the basis of the DCI, offset information K or a slot index for reception of PUSCH and may determine a PUSCH transmission slot index. For example, the UE may determine that the UE is scheduled to transmit PUSCH in slot i+K 305 via the received offset information K, on the basis of slot index i 300 in which the PDCCH has been received. The UE may also determine slot i+K 305 or a PUSCH start symbol or time in slot i+K via received offset information K, on the basis of a CORESET in which the PDCCH 310 has been received.

The UE may acquire, from DCI, information relating to a PUSCH transmission time-frequency resource area 340 in the PUSCH transmission slot 305. The PUSCH transmission frequency resource area information may be group unit information of PRB or PRB. A frequency resource 330 indicated by the PUSCH transmission frequency resource area information is an area included in an initial uplink bandwidth (BW) 335 or an initial uplink bandwidth part (BWP) determined or configured by the UE via an initial access procedure. If the UE is configured with an uplink bandwidth (BW) or an uplink bandwidth part (BWP) via a higher signal, the frequency resource 330 indicated by the PUSCH transmission frequency resource area information is an area included in the uplink bandwidth (BW) or the uplink bandwidth part (BWP) configured via the upper signal.

PUSCH transmission time resource area information 325 may be a symbol or group unit information of a symbol, or may be information indicating absolute time information. The PUSCH transmission time resource area information 325 may be expressed in a combination of a PUSCH transmission start time or symbol and a length of PUSCH or a PUSCH end time or symbol, and may be included, as one field or value, in DCI. The PUSCH transmission time resource area information 325 may be included in the DCI, as a field or value representing each of the PUSCH transmission start time or symbol and the length of PUSCH or the PUSCH end time or symbol. The UE may transmit PUSCH in the PUSCH transmission resource area 340 determined based on the DCI.

Hereinafter, a downlink control channel in the 5G communication system will be described in more detail with reference to the drawings.

Figure 4:
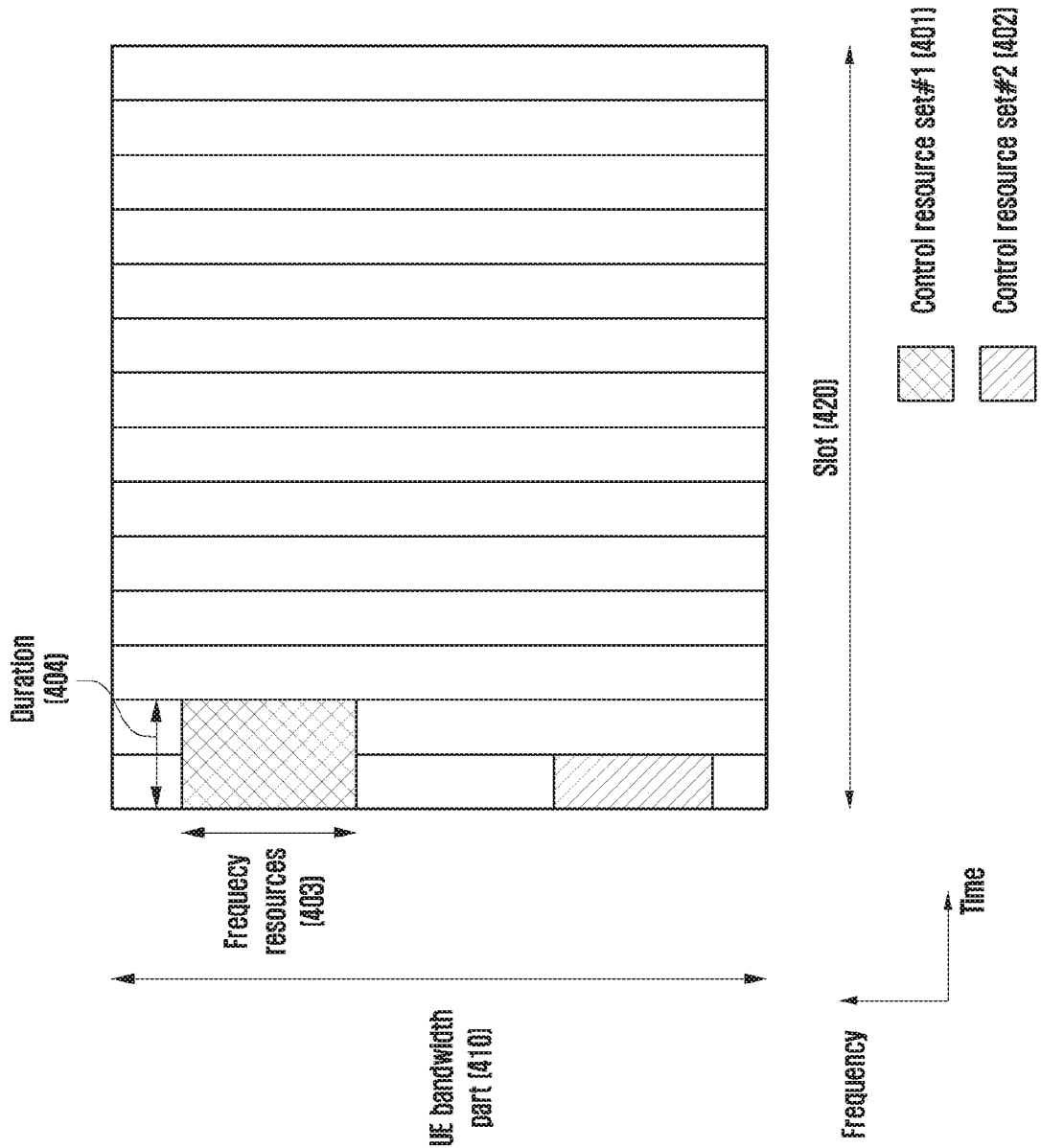
FIG. 4 is a diagram illustrating an example of a control area configuration for a downlink control channel in the NR according to an embodiment of the disclosure.

FIG. 4 is a diagram illustrating an example of a control resource set (CORESET) at which a downlink control channel is transmitted in the 5G wireless communication system according to an embodiment of the disclosure.

FIG. 4 shows an example in which a bandwidth part 410 of a UE is configured on the frequency axis and one slot 420 having two control areas (control area #1 401 and control area #2 402) are configured on the time axis. The control areas 401 and 402 may be configured for a specific frequency resource 403 in the entire UE bandwidth part 410 on the frequency axis. One or more OFDM symbols may be configured on the time axis, which may be defined as a control resource set duration 404. Referring to FIG. 4, control area #1 401 is configured to be a control area length of 2 symbols, and control area #2 402 is configured to be a control area length of 1 symbol.

The control area in the 5G system described above may be configured via higher layer signaling (e.g., system information, master information block (MIB), and radio resource control (RRC) signaling) to the UE by a base station. Configuring a control area to the UE refers to providing information, such as an identifier (identity) of the control area, a frequency location of the control area, and a symbol length of the control area. For example, the following information may be included.

Further, frequencyDomainResources configuration information configures a frequency resource of a corresponding CORESET via a bitmap. Each bit indicates a group of 6 PRBs that do not overlap. A first group refers to a group of 6 PRBs having a first PRB start index as $6 \cdot \lceil N_{BWP}^{start}/6 \rceil$, where $N_{SWP}^{start}$ represents a BWP start point. A most significant bit of the bitmap indicates a first group and is configured in ascending order.

Figure 5:
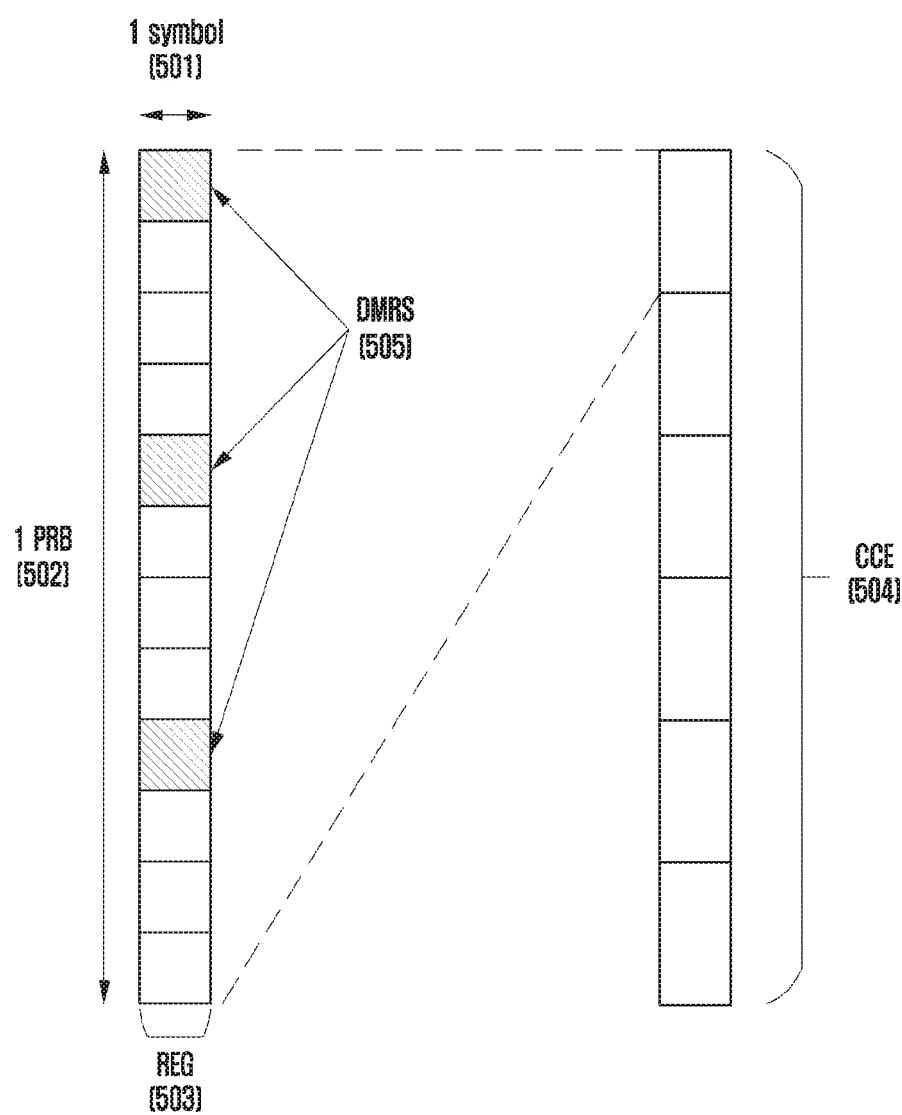
FIG. 5 is a diagram illustrating a structure of a downlink control channel in the NR according to an embodiment of the disclosure.

FIG. 5 is a diagram showing an example of a basic unit of time and frequency resources constituting a downlink control channel which may be used in the 5G system according to an embodiment of the disclosure.

Referring to FIG. 5, a basic unit of time and frequency resources constituting a control channel is referred to as a resource element group (REG) 503, and a REG 503 may be defined to have 1 OFDM symbol 501 on the time axis and 1 physical resource block (PRB) 502 (i.e., 12 subcarriers), on the frequency axis. A downlink control channel allocation unit may be configured by concatenating the REG 503.

Referring to FIG. 5, when a basic unit for allocation of a downlink control channel in the 5G system is a control channel element (CCE) 504, 1 CCE 504 may include a plurality of REGs 503. Referring to the REG 503 illustrated in FIG. 4 as an example, the REG 503 may include 12 REs, and if 1 CCE 504 includes 6 REGs 503, it means that 1 CCE 504 may include 72 Res. When a downlink control area is configured, the area may include multiple CCEs 504, and a specific downlink control channel may be mapped to one or more CCEs 504 and transmitted according to an aggregation level (AL) within the control area. The CCEs 504 in the

TABLE 3

```
ControlResourceSet ::=          SEQUENCE {
-- Corresponds to L1 parameter 'CORESET-ID'
controlResourceSetId            ,
    (control area identifier (Identity))
frequencyDomainResources        BIT STRING (SIZE (45)),
    (frequency axis resource allocation information)
duration                        INTEGER (1..maxCoReSetDuration),
    (time axis resource allocation information)
cce-REG-MappingType             CHOICE {
    (CCE-to-REG mapping scheme)
        interleaved             SEQUENCE {
            reg-BundleSize      ENUMERATED {n2, n3, n6},
            (REG bundle size)
            precoderGranularity ENUMERATED
{sameAsREG-bundle, allContiguousRBs},
            interleaverSize     ENUMERATED {n2, n3, n6}
            (interleaver size)
            shiftindex
    INTEGER(0..maxNrofPhysicalResourceBlocks-1)
    OPTIONAL
            (interleaver shift (Shift))
        },
        nonInterleaved          NULL
    },
    tci-StatesPDCCH             SEQUENCE(SIZE
(1..maxNrofTCI-StatesPDCCH)) OF TCI-StateId          OPTIONAL,
        (QCL(Quasi Co-Location) configuration information)
    tci-PresentInDCI            ENUMERATED {enabled}
                                OPTIONAL,     -- Need S
}
```

In Table 3, tci-StatesPDCCH (referred to as TCI state) configuration information may include information of one or more synchronization signal (SS)/physical broadcast channel (PBCH) block indexes or channel state information reference signal (CSI-RS) indexes having a quasi co location (QCL) relationship with demodulation reference signal (DMRS) transmitted in the corresponding control area.

control area are classified by numbers, and the numbers may be assigned according to a logical mapping scheme.

The basic unit of the downlink control channel illustrated in FIG. 5 (i.e., the REG 503), may include both REs, to which DCI is mapped, and an area to which a demodulation reference signal (DMRS) 505, which is a reference signal for decoding the REs, is mapped. As shown in FIG. 5, 3 DMRSs 505 may be transmitted in 1 REG 503.

The number of CCEs required to transmit PDCCH may be 1, 2, 4, 8, or 16 depending on the aggregation level (AL), and different numbers of CCEs may be used to implement link adaptation of the downlink control channel. For example, if AL=L, one downlink control channel may be transmitted via the L number of CCEs. The UE needs to detect a signal without knowing information on the downlink control channel, and a search space representing a set of CCEs is used to aid in such blind decoding. The search space is a set of downlink control channel candidates including CCEs, for which the UE should attempt decoding on a given aggregation level. Since there are various aggregation levels that make one bundle with 1, 2, 4, 8, or 16 CCEs, the UE has multiple search spaces. The search space set may be defined as a set of search spaces at all set aggregation levels.

The search space may be classified into a common search space and a UE-specific search space. In order to receive common control information such as paging messages or dynamic scheduling for system information, a certain group of UEs or all UEs may check a common search space of PDCCH. For example, PDSCH scheduling allocation information for transmission of an SIB including cell operator information, etc. may be received by checking the common search space of PDCCH. In the case of the common search space, the certain group of UEs or all UEs need to receive PDCCH, and may thus be defined as a set of predetermined CCEs. Scheduling allocation information for UE-specific PDSCH or PUSCH may be received by checking the UE-specific search space of PDCCH. The UE-specific search space may be defined UE-specifically on the basis of a UE identity and functions of various system parameters.

In the 5G system, a parameter for the search space of PDCCH may be configured from the base station to the UE via higher layer signaling (e.g., SIB, MIB, and RRC signaling). For example, the base station may configure, to the UE, the number of PDCCH candidates at each aggregation level L, a monitoring period for a search space, a monitoring occasion per symbol in a slot for the search space, a search space type (common search space or UE-specific search space), a combination of an RNTI and a DCI format, which is to be monitored in the search space, a control area index for monitoring the search space, etc. For example, the following information may be included.

TABLE 4

```
SearchSpace ::=                        SEQUENCE {
   -- Identity of the search space. SearchSpaceId = 0 identifies the SearchSpace
configured via PBCH (MIB) or ServingCellConfigCommon.
      searchSpaceId                    SearchSpaceId,
      (search space identifier)
      controlResourceSetId             ControlResourceSetId,
      (control area identifier)
      monitoringSlotPeriodicityAndOffset   CHOICE {
      (monitoring slot level period)
         sl1                           NULL,
         sl2                           INTEGER (0..1),
         sl4                           INTEGER (0..3),
         sl5                           INTEGER (0..4),
         sl8                           INTEGER (0..7),
         sl10                          INTEGER (0..9),
         sl16                          INTEGER (0..15),
         sl20                          INTEGER (0..19)
      }
                                       OPTIONAL,
      monitoringSymbolsWithinSlot         BIT STRING (SIZE (14))
                                       OPTIONAL,
      (monitoring symbol in slots)
      nrofCandidates                   SEQUENCE {
      (number of PDCCH candidates per aggregation level)
         aggregationLevel1             ENUMERATED {n0, n1, n2, n3, n4,
n5, n6, n8},
         aggregationLevel2             ENUMERATED {n0, n1, n2, n3, n4,
n5, n6, n8},
         aggregationLevel4             ENUMERATED {n0, n1, n2, n3, n4,
n5, n6, n8},
         aggregationLevel8             ENUMERATED {n0, n1, n2, n3, n4,
n5, n6, n8},
         aggregationLevel16            ENUMERATED {n0, n1, n2, n3, n4,
n5, n6, n8}
      },
      searchSpaceType                  CHOICE {
      (search space type)
         -- Configures this search space as common search space (CSS) and DCI
formats to monitor.
         common                        SEQUENCE {
         (Common search space)
         }
         ue-Specific                   SEQUENCE {
         (UE-specific search space)
            -- Indicates whether the UE monitors in this USS for DCI formats 0-0
and 1-0 or for formats 0-1 and 1-1.
            formats                    ENUMERATED {formats0-0-
And-1-0, formats0-1-And-1-1},
            ...
         }
```

According to the configuration information, the base station may configure one or more search space sets to the UE. For example, the base station may configure search space set 1 and search space set 2 to the UE, may configure DCI format A, which is scrambled with an X-RNTI in search space set 1, to be monitored in the common search space, and may configure DCI format B, which is scrambled with an Y-RNTI in search space set 2, to be monitored in the UE-specific search space.

According to the configuration information, one or more search space sets may exist in the common search space or the UE-specific search space. For example, search space set #1 and search space set #2 may be configured to be the common search space, and search space set #3 and search space set #4 may be configured to be the UE-specific search space.

The following combinations of DCI formats and RNTIs may be monitored in the common search space:
  DCI format 0_0/1_0 with CRC scrambled by C-RNTI, CS-RNTI, SP-CSI-RNTI, RA-RNTI, TC-RNTI, P-RNTI, SI-RNTI
  DCI format 2_0 with CRC scrambled by SFI-RNTI
  DCI format 2_1 with CRC scrambled by INT-RNTI
  DCI format 2_2 with CRC scrambled by TPC-PUSCH-RNTI, TPC-PUCCH-RNTI
  DCI format 2_3 with CRC scrambled by TPC-SRS-RNTI The following combinations of DCI formats and RNTIs may be monitored in the UE-specific search space:
  DCI format 0_0/1_0 with CRC scrambled by C-RNTI, CS-RNTI, TC-RNTI
  DCI format 1_0/1_1 with CRC scrambled by C-RNTI, CS-RNTI, TC-RNTI The RNTIs specified above may follow the following definitions and uses:
  Cell RNTI (C-RNTI): For UE-specific PDSCH scheduling
  Temporary Cell RNT (TC-RNTI): For UE-specific PDSCH scheduling
  Configured Scheduling RNTI (CS-RNTI): For UE-specific PDSCH scheduling configured semi-statically
  Random Access RNTI (RA-RNTI): For PDSCH scheduling in a random access operation
  Paging RNTI (P-RNTI): For scheduling PDSCH via which paging is transmitted
  System Information RNTI (SI-RNTI): For scheduling PDSCH via which system information is transmitted punctured
  Transmit Power Control for PUSCH RNTI (TPC-PUSCH-RNTI): For indicating a power control command for PUSCH
  Interruption RNTI (INT-RNTI): For notification of whether PDSCH is
  Transmit Power Control for PUCCH RNTI (TPC-PUCCH-RNTI): For indicating a power control command for PUCCH
  Transmit Power Control for SRS RNTI (TPC-SRS-RNTI): For indicating a power control command for SRS In the 5G system, multiple search space sets may be configured by different parameters (e.g., DCI format), and therefore the set of search spaces monitored by the UE at each point in time may vary. For example, in a case where search space set #1 is configured to an X-slot period, and search space set #2 is configured to a Y-slot period, wherein X and Y are different, the UE may monitor both search space set #1 and search space set #2 in a specific slot, and may monitor one of search space set #1 and search space set #2 in another specific slot.

When multiple search space sets are configured in the UE, the following conditions may be considered in a method of determining a search space set to be monitored by the UE.

Condition 1: Limit the Maximum Number of PDCCH Candidates

The number of PDCCH candidates that may be monitored per slot does not exceed MH. Mu may be defined by the maximum number of PDCCH candidate groups per slot in a cell configured to a subcarrier spacing of 15.24 kHz, and may be defined by the following table.

TABLE 5

| $\mu$ | Maximum number of PDCCH candidates per slot and per serving cell ($M^\mu$) |
| --- | --- |
| 0 | 44 |
| 1 | 36 |
| 2 | 22 |
| 3 | 20 |

Condition 2: Limit the Maximum Number of CCEs

The number of CCEs constituting the entire search space (the entire search space refers to the entire CCE set corresponding to the union area of multiple search space sets) per slot does not exceed $C^\mu$. $C^\mu$ may be defined by the maximum number of CCEs per slot in a cell configured to a subcarrier spacing of 15.24 kHz, and may be defined in the following table.

TABLE 6

| $\mu$ | Maximum number of CCEs per slot and per serving cell ($C^\mu$) |
| --- | --- |
| 0 | 56 |
| 1 | 56 |
| 2 | 48 |
| 3 | 32 |

For the convenience of description, a situation in which both conditions 1 and 2 are satisfied at a specific point in time is defined as "condition A". Therefore, not satisfying condition A may refer to not satisfying at least one of the above conditions 1 and 2.

According to the configuration of the search space sets of the base station, a case in which the above-described condition A is not satisfied at a specific point in time may occur. If condition A is not satisfied at a specific point in time, the UE may select and monitor only some of the search space sets configured to satisfy condition A at the point in time, and the base station may transmit PDCCH to the selected search space sets.

A method of selecting some search spaces in the entire configured search space set may conform to the following method.

Method 1

If condition A for PDCCH is not satisfied at a specific time point (slot), the UE or base station may select a search space set, in which a search space type is configured to be a common search space, from among search space sets existing at a corresponding time point, preferentially over a search space set in which a search space type is configured to be a UE-specific search space.

If all search space sets configured to have common search spaces are selected (i.e., if condition A is satisfied even after all search spaces configured to be common search spaces are selected), the UE or base station may select the search space sets configured to have UE-specific search spaces. If there are multiple search space sets configured to have UE-specific search spaces, a search space set having a low search space set index may have a higher priority. In consideration of the priority, the UE-specific search space sets may be selected within a range in which condition A is satisfied.

In the NR system, the base station has a CSI framework for indicating measurement and reporting of channel state information (CSI) of the UE. The CSI framework of the NR may include at least two elements that are resource setting and report setting, wherein the report setting may have a connection relationship with the resource setting by referring to at least one ID of the resource setting. The base station may indicate the UE to report channel state information (CSI) via higher signaling, which includes radio resource control (RRC) signaling or medium access control (MAC) control element (MAC) signaling, or via L1 signaling (e.g., common DCI, group-common DCI, and UE-specific DCI).

For example, the base station may indicate an aperiodic channel information report (CSI report) to the UE via higher signaling or DCI using DCI format 0_1. For another example, the base station may indicate a semi-persistent CSI report via higher signaling or DCI using DCI format 0_1. The base station may activate or deactivate the semi-persistent CSI report via higher signaling including MAC CE signaling or DCI scrambled with a semi-persistent (SP)-CSI-RNTI. When the semi-persistent CSI report is activated, the UE may periodically report channel information according to a configured slot interval. When the semi-persistent CSI report is deactivated, the UE may stop periodic channel information reporting which has been activated. For another example, the base station may indicate a periodic CSI report to the UE via higher signaling. The base station may activate or deactivate the periodic CSI report via higher layer signaling including RRC signaling. When the periodic CSI report is activated, the UE may periodically report channel information according to a configured slot interval. When the periodic CSI report is deactivated, the UE may stop periodic channel information reporting which has been activated.

In the case of the NR communication system, in order to provide various services and support a high data rate, an uplink signal (configured grant PUSCH or CG-PUSCH) may be transmitted without uplink scheduling information. When an uplink signal is to be transmitted without uplink scheduling information, information, such as MCS and resource allocation for uplink transmission, may be configured via RRC signaling or DCI of PDCCH, and uplink transmission which can be performed may be described by classification into at least the following types according to an uplink transmission configuration reception scheme.

Type 1: Uplink transmission configuration using RRC signaling

Type 2: Uplink transmission configuration using an uplink data channel of a physical layer FIG. 6 is a diagram illustrating an example of transmitting an uplink signal without uplink scheduling information in an unlicensed band according to an embodiment of the disclosure.

Figure 6:
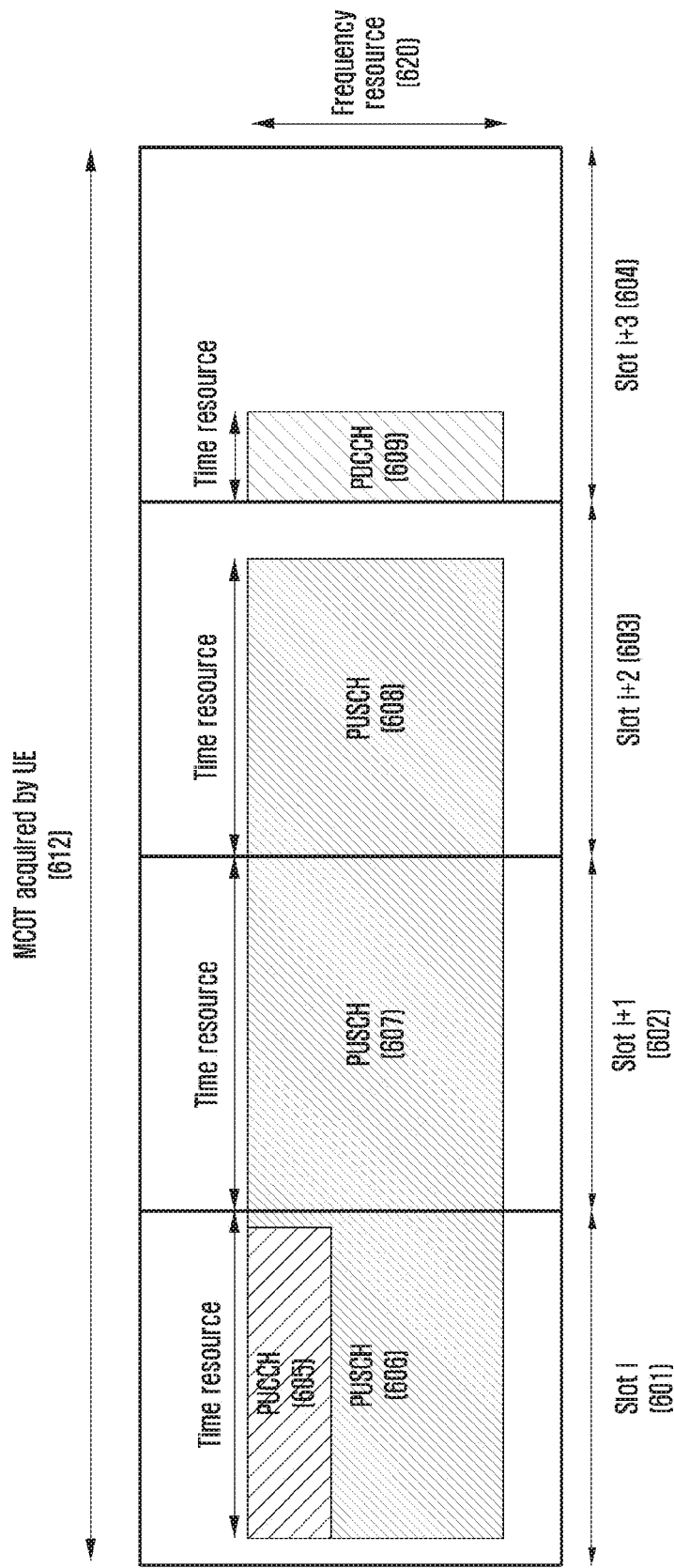
FIG. 6 is a diagram illustrating an example of transmitting an uplink signal without uplink scheduling information in the NR according to an embodiment of the disclosure.

Referring to FIG. 6, in an unlicensed band, a channel access procedure is performed to transmit an uplink signal without uplink scheduling information. When the UE accesses the unlicensed band by performing the channel access procedure for a variable time, the UE may schedule downlink transmission in a last slot 604 of slots 601, 602, 603, and 604, or a last subframe 604 within a maximum channel occupancy time 612 via a channel occupancy time sharing indicator of uplink control information 605. The base station determines whether to access a channel, by performing a channel access procedure for a fixed time, and the UE configures one last symbol of a subframe 608 or a slot 608 for uplink transmission, as a gap interval which is emptied for the channel access procedure of the base station. When transmitting CG-PUSCH in the unlicensed band, the UE may add, to the CG-PUSCH, CG uplink control information (CG-UCI) including HARQ ID, RV, and CG-PUSCH scheduling information of the CG-PUSCH, and transmit the CG-PUSCH, wherein all CG-PUSCHs may include at least one CG-UCI.

In the NR communication system, if an uplink control channel overlaps an uplink data channel and satisfies a transmission time condition, or if it is indicated to transmit uplink control information to the uplink data channel via L1 signaling or higher signaling, the uplink control information may be included in the uplink data channel so as to be transmitted. HARQ-ACK, CSI part 1, CSI part 2, these three pieces of uplink control information may be transmitted via the uplink data channel, and each piece of uplink control information may be mapped to PUSCH according to a predetermined multiplexing rule.

In a first operation, if the number of HARQ-ACK information bits to be included in PUSCH is 2 bits or less, the UE reserves an RE to transmit HARQ-ACK information in advance. A method of determining a resource for reserve is the same as the second operation. In the second operation, if the number of HARQ-ACK information bits to be transmitted by the UE is more than 2 bits, the UE may map HARQ-ACK information from a first OFDM symbol, which does not include a DMRS, after a first DMRS symbol of PUSCH. In a third operation, the UE may map CSI part1 to PUSCH. CSI part1 may be mapped from the first OFDM symbol of PUSCH, not the DMRS, and may not be mapped to the RE reserved in the first operation and the RE to which an HARQ-ACK is mapped in the second operation.

In the fourth operation, the UE may map CSI part2 to PUSCH. CSI part2 may be mapped from the first OFDM symbol of PUSCH, not the DMRS, and may not be mapped to the RE where CSI part1 is located and the RE where the HARQ-ACK mapped to the RE in the second operation is located. In a fifth operation, if the HARQ-ACK is smaller than 2 bits, the UE may puncture the HARQ-ACK and map the same to the RE reserved in the first operation. If the number of bits or the number of modulated symbols of uplink control information to be mapped to PUSCH is greater than the number of bits (or REs) which enable uplink control information mapping in the corresponding OFDM symbol to be mapped, the frequency axis RE interval d between modulated symbols of the uplink control information to be mapped may be configured so that d=1. If the number of bits or the number of modulated symbols of the uplink control information to be mapped to PUSCH by the UE is less than the number of bits (or REs) which enable uplink control information mapping in the corresponding OFDM symbol to be mapped, the frequency axis RE interval d between modulated symbols of the uplink control information to be mapped may be configured so that d=floor(# of available bits on 1-OFDM symbol/# of unmapped UCI bits at the beginning of 1-OFDM symbol).

Figure 7:
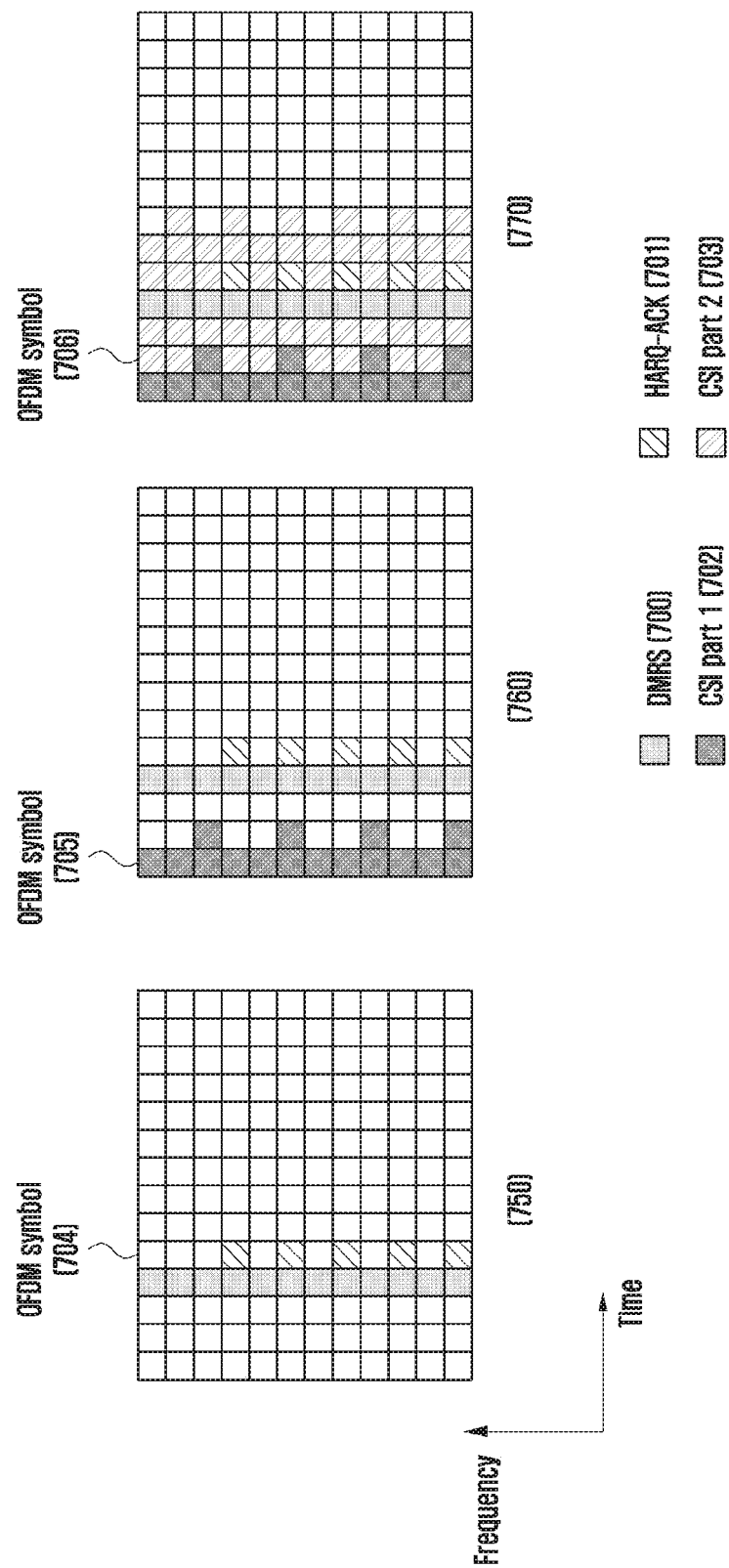
FIG. 7 is a diagram illustrating an example of multiplexing uplink control information to an uplink data channel in the NR according to an embodiment of the disclosure.

FIG. 7 shows an example of mapping uplink control information to a PUSCH according to an embodiment of the disclosure.

Referring to FIG. 7, it is assumed that the number of HARQ-ACK symbols to be mapped to PUSCH is 5, and one resource block is configured or scheduled to PUSCH. First, as shown in part (a) of FIG. 7 (750), a UE may map an HARQ-ACK 701 with five symbols from a lowest RE index (or a highest RE index) of a first OFDM symbol 704 that does not include a DMRS after a first DMRS 700 at d=floor(12/5)-2 intervals on the frequency axis. Next, the UE may map CSI-part1 702 from a first OFDM symbol 705, not a DMRS, as shown in part (b) of FIG. 7 (760). Finally, as shown in part (c) of FIG. 7 (770), the UE may map CSI part 2 703 to an RE to which CSI-part1 and the HARQ-ACK are not mapped, from the first OFDM symbol 706 that does not include the DMRS.

If three pieces of existing UCIs described above are included in CG-PUSCH configured in an unlicensed band so as to be transmitted, a total of four pieces of UCI (CG-UCI, HARQ-ACK, CSI-part1, and CSI-part2) may be configured or scheduled in the CG-PUSCH. However, in the NR system, up to three pieces of uplink control information may be included in the uplink data channel so as to be transmitted, and therefore there is a need for a method of generating or selecting three pieces of UCI from among CG-UCI and the existing three pieces of UCI (HARQ-ACK, CSI-part1, and CSI-part2) and adding the generated or selected UCI to CG-PUSCH, thereby transmitting the same.

The disclosure proposes, in relation to a base station and a UE which are configured to receive or transmit a downlink signal or an uplink signal in an unlicensed band, a method for transmitting uplink control information by the UE. The disclosure proposes a method and device, in which the UE configures, adjusts, or modifies, uplink control information to be transmitted via an uplink data channel, on the basis of information configured or schedule from the base station, so as to add the uplink control information to the uplink data channel.

Hereinafter, the method and device proposed in the embodiments are not limited or applied to each embodiment, and can be utilized for a method and device for transmitting or adjusting the uplink control information, by using all of or a combination of some of one or more embodiments proposed in the disclosure. The embodiments may be described using an example of a case in which, as shown in semi-persistent scheduling (SPS) or configured grant transmission, a UE is configured with PUSCH transmission from a base station via a high signal configuration even without reception of DCI, and performs the PUSCH transmission. However, the embodiments may also be applicable even when the UE is scheduled to receive PDSCH or transmit PDSCH, by the base station on the basis of DCI. In addition, the embodiment may also be applicable for a case of transmitting uplink control information in a broadband system, such as subband-based broadband unlicensed band or multi-carrier or carrier aggregation transmission. In the embodiments, descriptions will be made on the assumption of a base station and a UE operating in an unlicensed band. However, the method and device proposed in the embodiments may also be applicable for a base station and a UE operating in a licensed band, a shared band (shared spectrum), or a sidelink, as well as the unlicensed band.

Embodiment 1

The first embodiment includes, in relation to a base station and a UE operating in an unlicensed band, a method of configuring, by the UE, uplink control information that is to be included in an uplink data channel. A method and device is proposed in which a UE decides or determines uplink control information to be included in an uplink data channel, by determining the priority of the uplink control information on the basis of information configured or indicated by a base station.

Operations of the first embodiment will be described with reference to FIG. 8 as follows.

Figure 8:
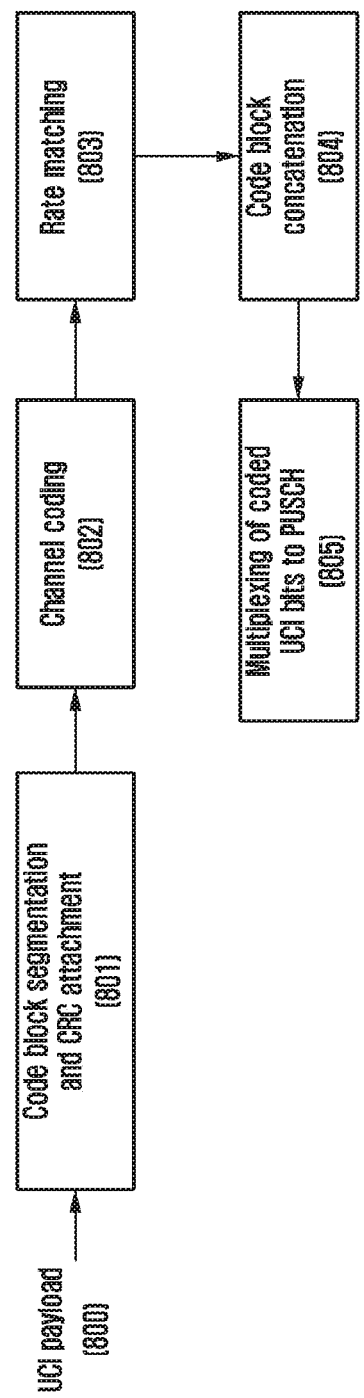
FIG. 8 is a diagram illustrating an example of generating uplink control information according to an embodiment of the disclosure.

FIG. 8 is a diagram illustrating an example of separately encoding uplink control information according to an embodiment of the disclosure.

In a base station and a UE which transmit or receive a signal in an unlicensed band, it is assumed that the UE is configured to perform PUCCH and/or PUSCH transmission in multiple slots on the basis of a configured grant configuration.

Referring to FIG. 8, the UE may perform separate encoding including code block generation 801 and channel coding 802 for each of payload corresponding to uplink control information 800 (e.g., CG-UCI, HARQ-ACK, CSI-part1, or CSI-part2) to be transmitted to CG-PUSCH. Thereafter, the uplink control information is rate matched 803, code block concatenated 804, and multiplexed 805 to PUSCH. In consideration of a CG-PUSCH resource configured or scheduled by the base station and maximum X (e.g., X=3) pieces of uplink control information which may be included in an uplink data channel which may be preconfigured (or predetermined) by the base station or configured via L1 or higher signaling, the UE may decide or determine a method of configuring uplink control information that is to be included in the uplink data channel. In the following, a method of deciding or determining the priority of uplink control information is specifically proposed.

1-1th Embodiment

The UE may determine that CG-UCI is uplink control information having the highest priority, and may add at least one piece of uplink control information to CG-PUSCH so as to transmit the same. The UE may transmit X pieces of uplink control information having the highest priority including CG-UCI via CG-PUSCH, and uplink control information other than the X pieces thereof may not be included in the CG-PUSCH (or may be omitted or delayed). For example, if the maximum number of pieces of uplink control information that may be included in CG-PUSCH is 3, the UE may add CG-UCI, HARQ-ACK, and CSI-part1 to the CG-PUSCH so as to transmit the same, and CSI-part2 may be omitted (or delayed). As another method, the UE may add only CG-UCI to the CG-PUSCH so as to transmit the same, and other uplink control information may not be included in the CG-PUSCH. In the following, a more specific method of determining CG-UCI to have the highest priority will be described.

Method 1

If the base station configures, via L1 signaling or higher signaling, a semi-static HARQ-ACK codebook to be used (or if an HARQ-ACK codebook size is fixed), the UE may determine that CG-UCI has the highest priority.

Method 2

The base station may activate CG-PUSCH transmission by the UE, by using downlink control information. The UE may determine that CG-UCI has the highest priority only if transmission is performed while uplink control information is included in a first CG-PUSCH, during one or more CG-PUSCH transmissions activated via the downlink control information.

Method 3

The base station (or UE) may indicate the UE (or base station) to add information (e.g., MCS, beta offset, TBS, etc.) required for uplink control information generation to CG-UCI, via a default value (or predetermined information), L1 signaling, or higher signaling. Here, the UE may determine that the CG-UCI has the highest priority.

1-2th Embodiment

The UE may determine that HARQ-ACK is uplink control information having the highest priority, and may add at least one piece of uplink control information to CG-PUSCH so as to transmit the same. The UE may transmit X pieces of uplink control information having the highest priority including HARQ-ACK via CG-PUSCH, and uplink control information other than the X pieces thereof may not be included in the CG-PUSCH (or may be omitted or delayed).

For example, if the maximum number of pieces of uplink control information that may be included in CG-PUSCH is 2, the UE may add HARQ-ACK and CG-UCI to the CG-PUSCH so as to transmit the same, and CSI-part1 and CSI-part2 may not be included. As another method, the UE may add only HARQ-ACK to the CG-PUSCH so as to transmit the HARQ-ACK, or may transmit the HARQ-ACK by using PUCCH without transmitting (or with delaying or omitting) the CG-PUSCH. In this case, uplink control information other than HARQ-ACK may not be transmitted. As another method, when the UE is to transmit HARQ-ACK by using PUCCH without transmitting CG-PUSCH, if a gap is generated between transmission of the corresponding PUCCH and transmission of the next CG-PUSCH due to not transmitting the CG-PUSCH, and a channel access procedure needs to be performed, the UE may puncture the CG-PUSCH by a symbol length corresponding to the PUCCH to transmit the HARQ-ACK and then transmit the HARQ-ACK.

In the following, a more specific method in which HARQ-ACK may have the highest priority will be described.

Method 4

If the base station is configured to use a dynamic HARQ-ACK codebook (or if the HARQ-ACK codebook size is variable) via L1 signaling or higher signaling, the UE may determine that HARQ-ACK has the highest priority.

Method 5

If the UE needs to transmit at least one piece of HARQ-ACK information having multiple priorities (e.g., HARQ-ACK for URLLC data or HARQ-ACK for eMBB data), the UE may determine or change (or reconfigure) an uplink control information transmission scheme according to the priority of HARQ-ACK. More specifically, the UE may determine that HARQ-ACK (e.g., HARQ-ACK for URLLC data) having the highest priority has the highest priority compared to other uplink control information (e.g., CG-UCI, CSI part1, or CSI part2).

When applying embodiment 1, the priority of uplink control information may be configured via L1 signaling or higher signaling, or may be determined by UE capability reporting. In the case of embodiment 1, the UE may determine uplink control information, which is to be included in CG-PUSCH, in consideration of the priority of each piece of uplink control information and a CG-PUSCH resource configured (or scheduled) by the base station, but there is a disadvantage in that uplink control information other than the maximum number of pieces of uplink control information that may be included in the CG-PUSCH cannot be transmitted.

Embodiment 2

The embodiment proposes, in relation to a base station and a UE operating in an unlicensed band, a method of configuring, by the UE, uplink control information that is to be included in an uplink data channel.

More specific descriptions are as follows. In a base station and a UE which transmit or receive a signal in an unlicensed band, it is assumed that the UE is configured to perform PUCCH and/or PUSCH transmission in multiple slots on the basis of a configured grant configuration. The UE may perform joint encoding of jointly encoding payloads corresponding to X (e.g., X=2) pieces of uplink control information in the uplink control information (e.g., CG-UCI, HARQ-ACK, CSI-part1, and CSI-part2) that is to be included and transmitted in CG-PUSCH.

Figure 9A:
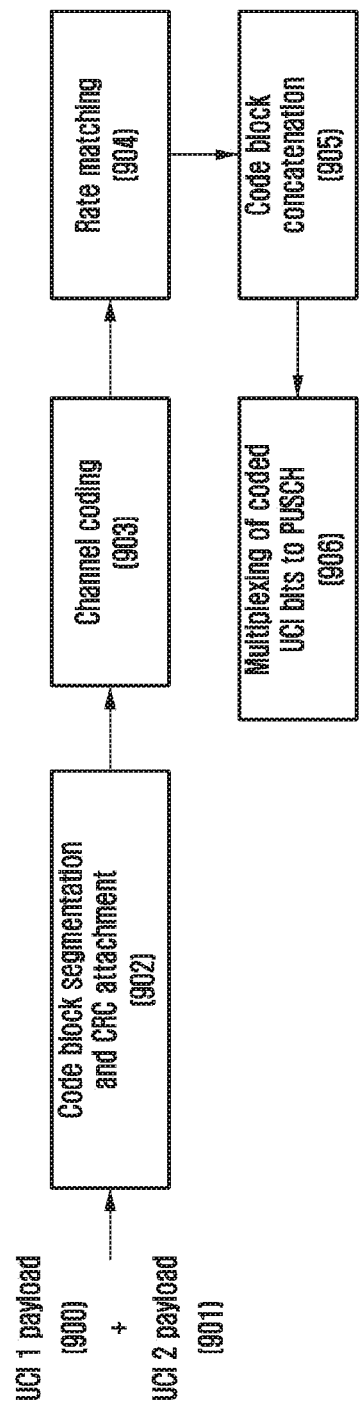
FIG. 9A is a diagram illustrating an example of jointly encoding uplink control information according to an embodiment of the disclosure.

FIG. 9A is a diagram illustrating an example of jointly encoding uplink control information according to an embodiment of the disclosure.

Referring to FIG. 9A, a UE may generate a code block 902 by bundling payloads of CG-UCI 900 and HARQ-ACK 901, and then may perform channel coding 903. Thereafter, the encoded uplink control information is rate matched 904, each code block thereof is concatenated 905, and then the encoded uplink control information is multiplexed 906 to PUSCH.

Figure 9B:
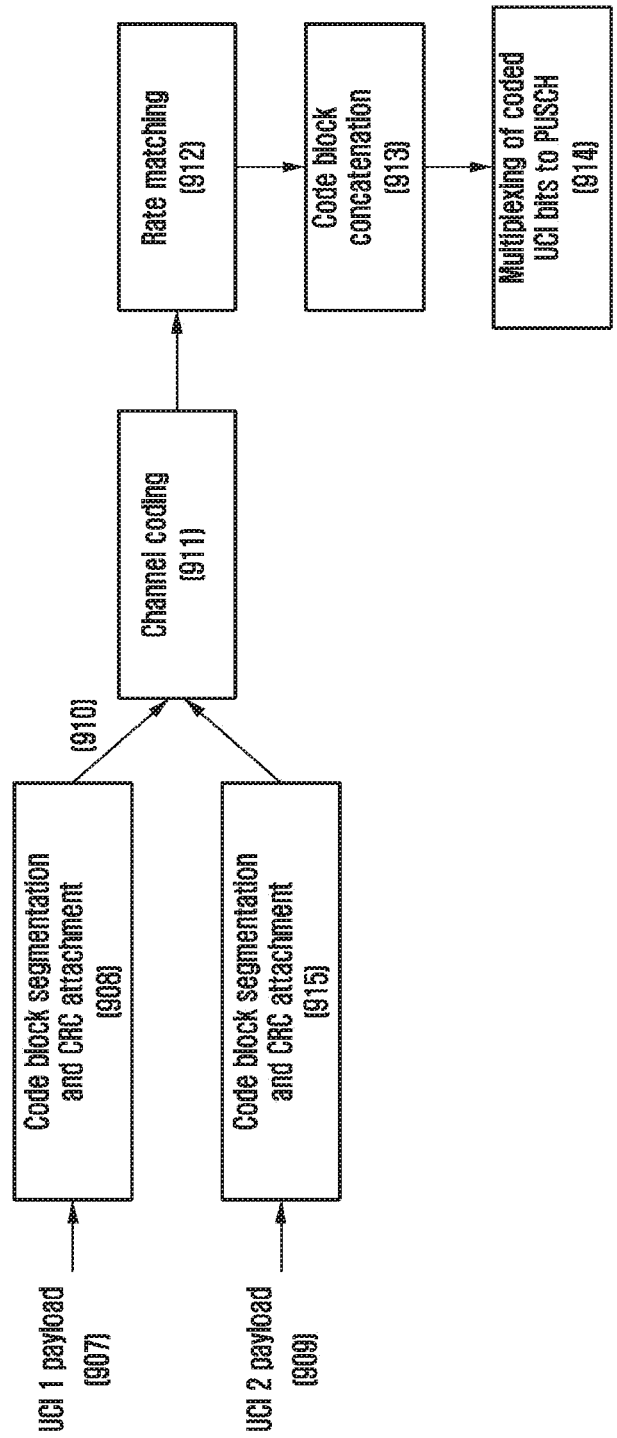
FIG. 9B is a diagram illustrating another example of jointly encoding uplink control information according to an embodiment of the disclosure.

FIG. 9B is a diagram illustrating another example of jointly encoding uplink control information according to an embodiment of the disclosure.

In another method, referring to FIG. 9B, a UE may generate code blocks 908, 915 for CG-UCI 907 and HARQ-ACK 909, respectively, and then may perform joint channel coding 910, 911 for the respective generated code blocks. Thereafter, the encoded uplink control information is rate matched 912, each code block thereof is concatenated 913, and then the encoded uplink control information is multiplexed 914 to PUSCH. FIG. 9B is a diagram illustrating another example of jointly encoding uplink control information. A UE may determine that jointly encoded uplink control information has the highest priority, and may add the jointly encoded uplink control information to CG-PUSCH 906, 914.

When applying embodiment 2, values of X payloads to perform joint encoding may be configured via L1 signaling or higher signaling, or may be determined by UE capability reporting. The embodiment is advantageous in that the UE may add, to CG-PUSCH configured (or scheduled) by the base station, all uplink control information that is configured (or scheduled) within CG-PUSCH resources, so as to transmit the same, but the embodiment is disadvantageous in that uplink control information cannot be added to the CG-PUSCH if CG-PUSCH resources for transmission of the uplink control information are insufficient.

Embodiment 3

The embodiment proposes, in relation to a base station and a UE operating in an unlicensed band, a method of configuring, by the UE, uplink control information that is to be included in an uplink data channel. More specifically, the embodiment proposes a method and device, in which a UE decides or determines uplink control information to be included in an uplink data channel, by using information configured or indicated by a base station.

In a base station and a UE which transmit or receive a signal in an unlicensed band, it is assumed that the UE is configured to perform PUCCH and/or PUSCH transmission in multiple slots on the basis of a configured grant configuration. The UE may generate uplink control information by using one of a separate encoding method and a joint encoding method, as an encoding method for generating uplink control information (e.g., CG-UCI, HARQ-ACK, CSI-part1, and CSI-part2) to be transmitted to CG-PUSCH on the basis of information configured (or indicated) via L1 signaling or higher signaling from the base station pr CG-PUSCH resource information configured (or scheduled) via the L1 signaling or higher signaling from the base station. Separate encoding refers to a method of encoding by applying channel coding to each payload corresponding to uplink control information, and joint encoding refers to a method of jointly encoding at least two payloads of payloads corresponding to uplink control information.

If the UE decides or determines a separate encoding scheme as an encoding method for generating uplink control information, the uplink control information to be included in CG-PUSCH is decided or determined based on first embodiment. If the UE determines a joint encoding scheme as the encoding method for generating uplink control information, the uplink control information to be included in CG-PUSCH is decided or determined based on second embodiment. Hereinafter, a method of deciding and determining whether to perform separate encoding and joint encoding, on the basis of information configured (or indicated) from the base station will be described in detail.

3-1th Embodiment

The UE may determine a scheme of encoding uplink control information to be included in CG-PUSCH, on the basis of a CSI reporting channel configured via L1 signaling or higher signaling from the base station. More specifically, if the base station indicates the UE to perform CSI reporting by using PUCCH (e.g., semi-persistent CSI reporting or periodic CSI reporting using MAC CE), the UE may generate uplink control information to be included in CG-PUSCH by performing separate encoding for generation of the uplink control information. As another method, if the UE receives, from the base station, uplink grant DCI scrambled with an SP-CSI-RNTI, or if the UE is indicated, by the base station, for aperiodic CSI reporting based on DCI, the UE may perform a joint encoding method for generating uplink control information so as to generate the uplink control information to be included in CG-PUSCH.

3-2th Embodiment

If a UE receives DCI format 0_1 from a base station, a method of encoding uplink control information may be configured using a "UL-SCH indicator" field value included in DCI. More specifically, if the "UL-SCH indicator" field value included in DCI format 0_1 received from the base station indicates 0, the UE may generate uplink control information by using the joint encoding method. Such a value is merely an example. In other cases, the UE may generate uplink control information by using the separate encoding method.

3-3th Embodiment

A UE may determine an encoding method for generating uplink control information, on the basis of the amount of resources of CG-PUSCH, which is configured or scheduled by a base station. More specifically, if the UE is unable to add, to CG-PUSCH, uplink control information generated using joint encoding due to insufficient resources for transmission of uplink control information of CG-PUSCH, which are configured or scheduled by the base station (e.g., if equation 2 below is satisfied, if a resource occupied by calculated UCI, which is to be transmitted, is greater than a resource (e.g., RE) capable of UCI transmission in a configured PUSCH, or if the number of UCI bits to be transmitted is more than the number of UCI bits enabling transmission in the configured PUSCH), the UE may generate uplink control information by using the separate encoding method. If the UE is able to add, to CG-PUSCH, uplink control information generated using at least joint encoding due to sufficient resources for transmission of uplink control information of CG-PUSCH, which are configured or scheduled by the base station (e.g., if equation 2 below cannot be satisfied, if a resource occupied by calculated UCI, which is to be transmitted, is equal to or smaller than a resource (e.g., RE) capable of UCI transmission in a configured PUSCH, or if the number of UCI bits to be transmitted is equal to or less than the number of UCI bits enabling transmission in the configured PUSCH), the UE may generate uplink control information by using the joint encoding method. Equation 2 is merely an example, and whether separate encoding should be applied or joint encoding should be applied may be determined by the UE and/or the base station on the basis of at least one of parameters in equation 2.

$$\left[ \frac{(O_{CG-UCI} + O_{ACK} + L_{CG-UCI,ACK}) \cdot \beta_{offset}^{PUSCH} \cdot \sum_{l=0}^{N_{symb,all}^{PUSCH}-1} M_{sc}^{UCI}(l)}{\sum_{r=0}^{C_{UL-SCH}-1} K_r} \right] > \left[ \alpha \cdot \sum_{l=l_0}^{N_{symb,all}^{PUSCH}-1} M_{sc}^{UCI}(l) \right].$$

Equation 2

Here, $O_{CG-UCI}$ and $O_{ACK}$ denote the number of bits of payloads of CG-UCI and HARQ-ACK, respectively, and $L_{CG-UCI,ACK}$ denotes the number of CRC bits. $K_r$ is an r-th code block size, and $M_{sc}^{UCI}(l)$ represents the number of subcarriers in OFDM symbol 1 that can be used for UCI transmission in PUSCH configured or scheduled by the base station. $\alpha$ and $\beta_{offset}^{PUSCH}$ are values configured by the base station and are determined via higher signaling or L1 signaling. $N_{symb,all}^{PUSCH}$ denotes a total number of OFDM symbols of configured or scheduled PUSCH, and $C_{UL\_SCH}$ denotes the number of code blocks for PUSCH transmission. Finally, $l_0$ denotes a first OFDM symbol index that does not include a DMRS after a first DMRS symbol during PUSCH transmission.

When applying embodiment 3, the base station may indicate the UE to selectively determine an encoding scheme when generating an uplink via L1 signaling, higher signaling, or UE capability reporting. According to embodiment 3, there is an advantage in that the UE determines an encoding method for generating uplink control information differently according to importance of the uplink control information and resources of CG-PUSCH configured or scheduled by the base station, and therefore the UE can add the uplink control information to the CG-PUSCH so as to transmit the uplink control information more flexibly.

Embodiment 4

The fourth embodiment proposes, in relation to a base station and a UE which operate in an unlicensed band, a method of mapping uplink control information generated by the UE to an uplink data channel. More specifically, the embodiment proposes a method and device, in which the UE determines the priority of uplink control information on the basis of information configured or indicated by the base station, and adds (or maps), to CG-PUSCH, the uplink control information generated using a separate encoding scheme, on the basis of the determined priority.

4-1th Embodiment

Figure 10:
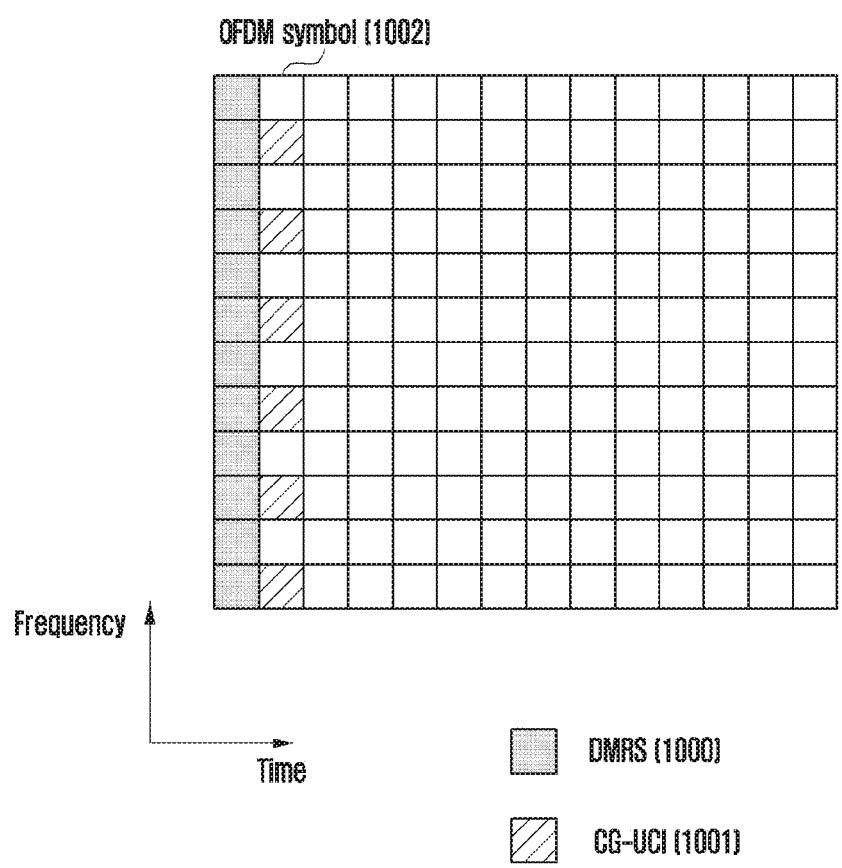
FIG. 10 is a diagram illustrating an example of mapping configured grant (CG)-uplink control information (UCI) according to an embodiment of the disclosure.

FIG. 10 is a diagram illustrating an example of mapping CG-UCI according to an embodiment of the disclosure.

If a UE transmits CG-PUSCH including only CG-UCI, the UE may add the CG-UCI to the CG-PUSCH on the basis of the aforementioned multiplexing rule of HARQ-ACK.

More specifically, referring to FIG. 10, the UE may map CG-UCI 1001 to CG-PUSCH from a first OFDM symbol 1002 that does not include a DMRS after a first DMRS symbol 1000. Here, RE spacing between uplink control information symbols on the frequency axis may be determined in the same manner as described above.

4-2th Embodiment

Figure 11:
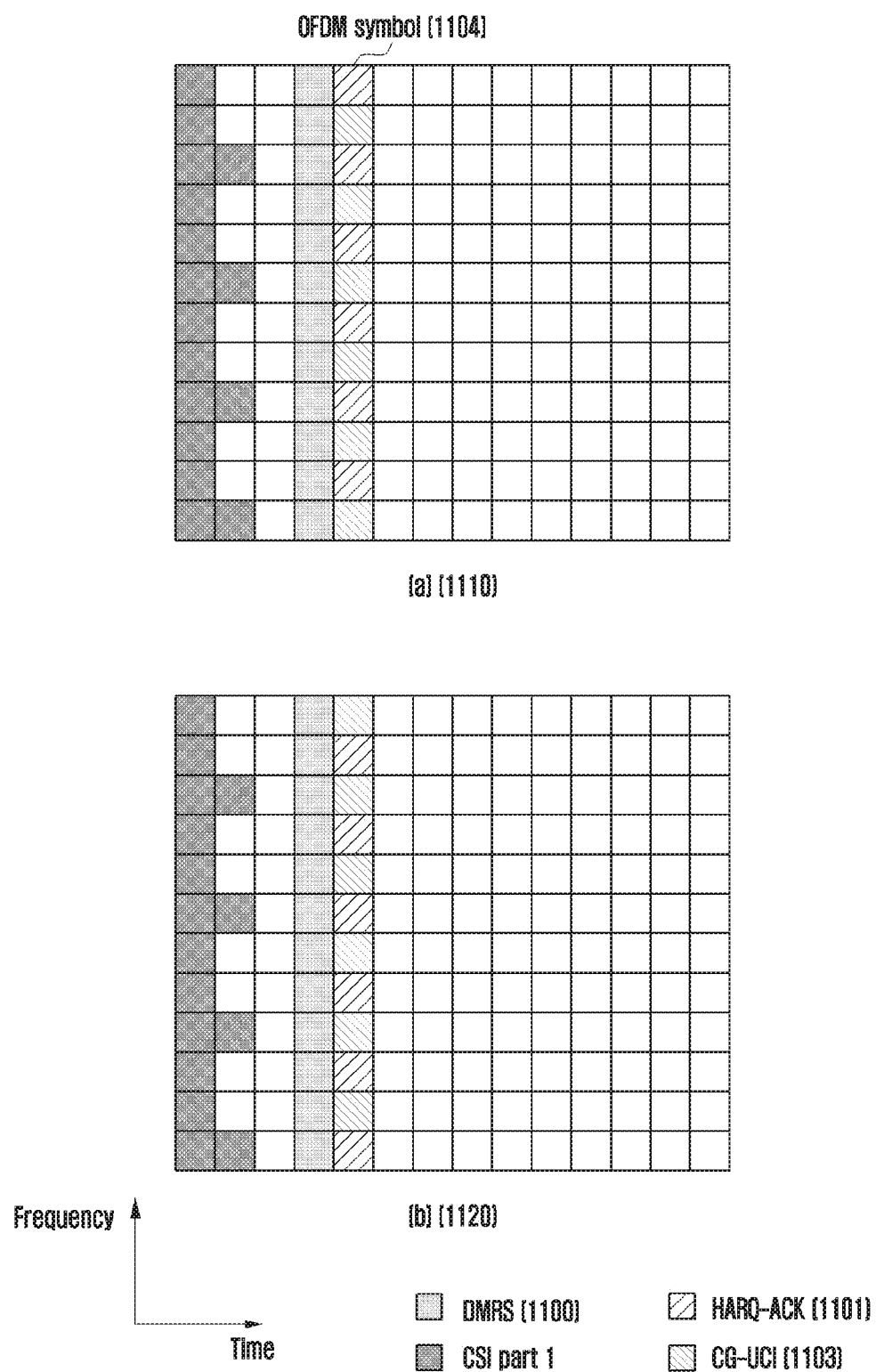
FIG. 11 is a diagram illustrating an example of mapping CG-UCI according to an embodiment of the disclosure.

FIG. 11 is a diagram illustrating another example of mapping CG-UCI according to an embodiment of the disclosure.

After deciding and determining the priority of the uplink control information in the above-described manner, the UE may add the uplink control information to CG-PUSCH. If the UE decides or determines CG-UCI to be the uplink control information having the highest priority, the UE may first map the CG-UCI 1103 to CG-PUSCH on the basis of the aforementioned multiplexing rule of HARQ-ACK, and then may map HARQ-ACK 1101 to the CG-PUSCH in the same manner, as shown in part (a) of FIG. 11 (1110). In other words, the UE may first map the CG-UCI 1103 to the CG-PUSCH from a first OFDM symbol 1104 that does not include a DMRS after a first DMRS symbol 1100. RE spacing between uplink control information symbols on the frequency axis may be determined in the same manner as described above. Subsequently, the UE may map the HARQ-ACK 1101 to the CG-PUSCH on the basis of the aforementioned multiplexing rule of HARQ-ACK with respect to an RE to which CG-UCI is not mapped, from the first OFDM symbol 1104 that does not include the DMRS after the DMRS symbol 1100. If the UE decides (or determines) HARQ-ACK to be the uplink control information having the highest priority, it may be possible for the UE to map the uplink control information to the CG-PUSCH in the same manner described above, as shown in part (b) of FIG. 11 (1120).

4-3th Embodiment

Figure 12:
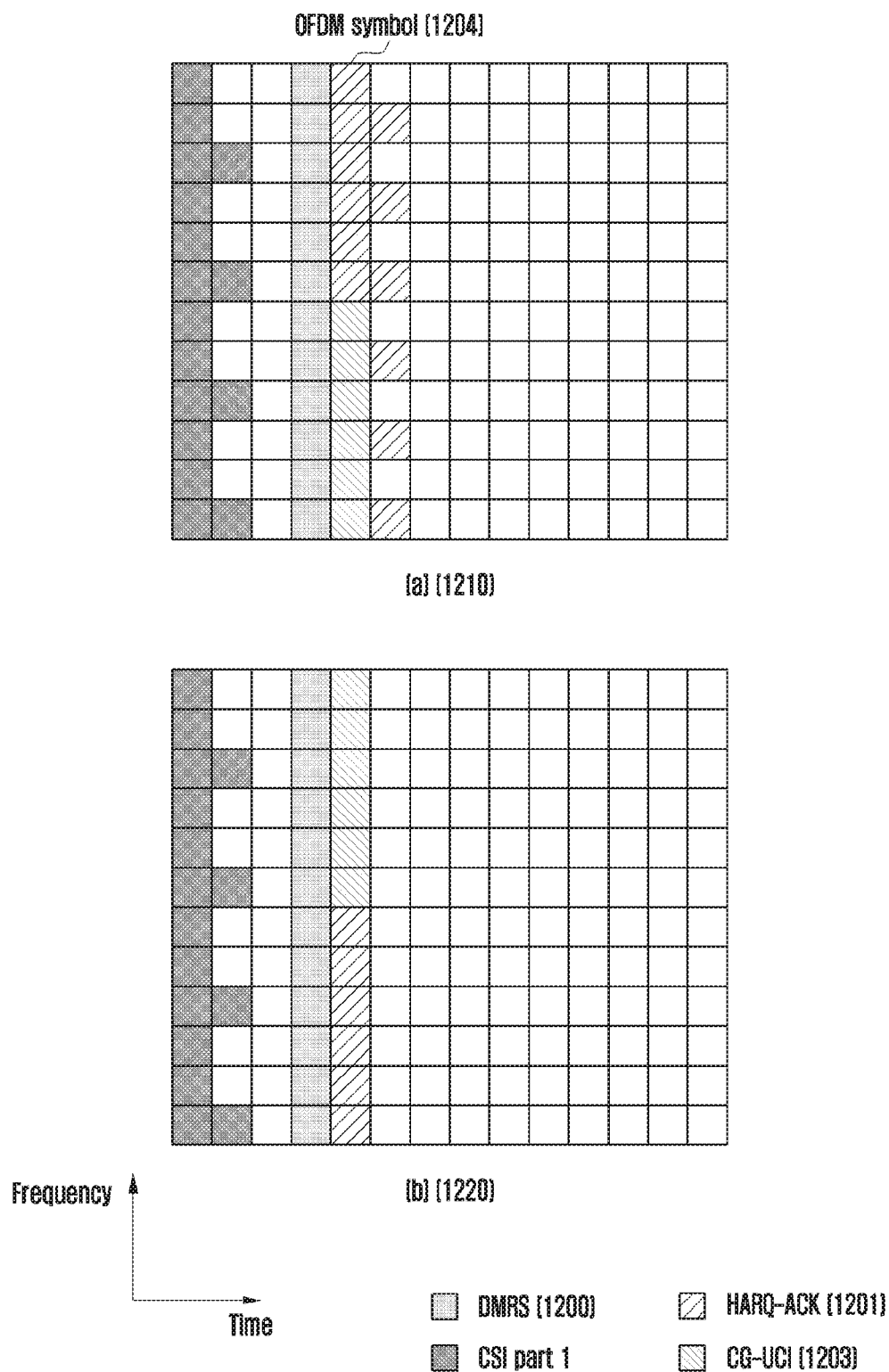
FIG. 12 is a diagram illustrating an example of mapping CG-UCI according to an embodiment of the disclosure.

FIG. 12 is a diagram illustrating another example of mapping CG-UCI according to an embodiment of the disclosure.

After deciding and determining the priority of uplink control information in the above-described manner, a UE may add the uplink control information to CG-PUSCH. If the UE decides (or determines) CG-UCI 1203 to be uplink control information having the highest priority, the UE may fix, to 1, RE spacing between uplink control information symbols on the frequency axis, and then may map the CG-UCI to the CG-PUSCH, as shown in part (a) of FIG. 12 (1210). In other words, the UE may map the CG-UCI 1203 to the CG-PUSCH from a first OFDM symbol 1204 that does not include a DMRS after a first DMRS symbol 1200. Subsequently, the UE may map HARQ-ACK 1201 to the CG-PUSCH on the basis of the aforementioned multiplexing rule of HARQ-ACK with respect to an RE to which CG-UCI is not mapped, from the first OFDM symbol 1204 that does not include the DMRS after the DMRS symbol. RE spacing between HARQ-ACK symbols in the frequency axis may be fixed to 1 or may be determined based on the aforementioned multiplexing rule of HARQ-ACK (e.g., equation 1). If the UE decides or determines the HARQ-ACK to be uplink control information having the highest priority, it may be possible for the UE to map the uplink control information to the CG-PUSCH in the same manner described above, as shown in part (b) of FIG. 12 (1220).

4-4th Embodiment

If the base station configures or schedules multiple DMRS symbols in one CG-PUSCH to the UE via L1 signaling or higher signaling (or a combination thereof), the UE may change, adjust, or reconfigure an OFDM symbol position to which the uplink control information included in the CG-PUSCH is mapped, according to the priority of the uplink control information.

Figure 13:
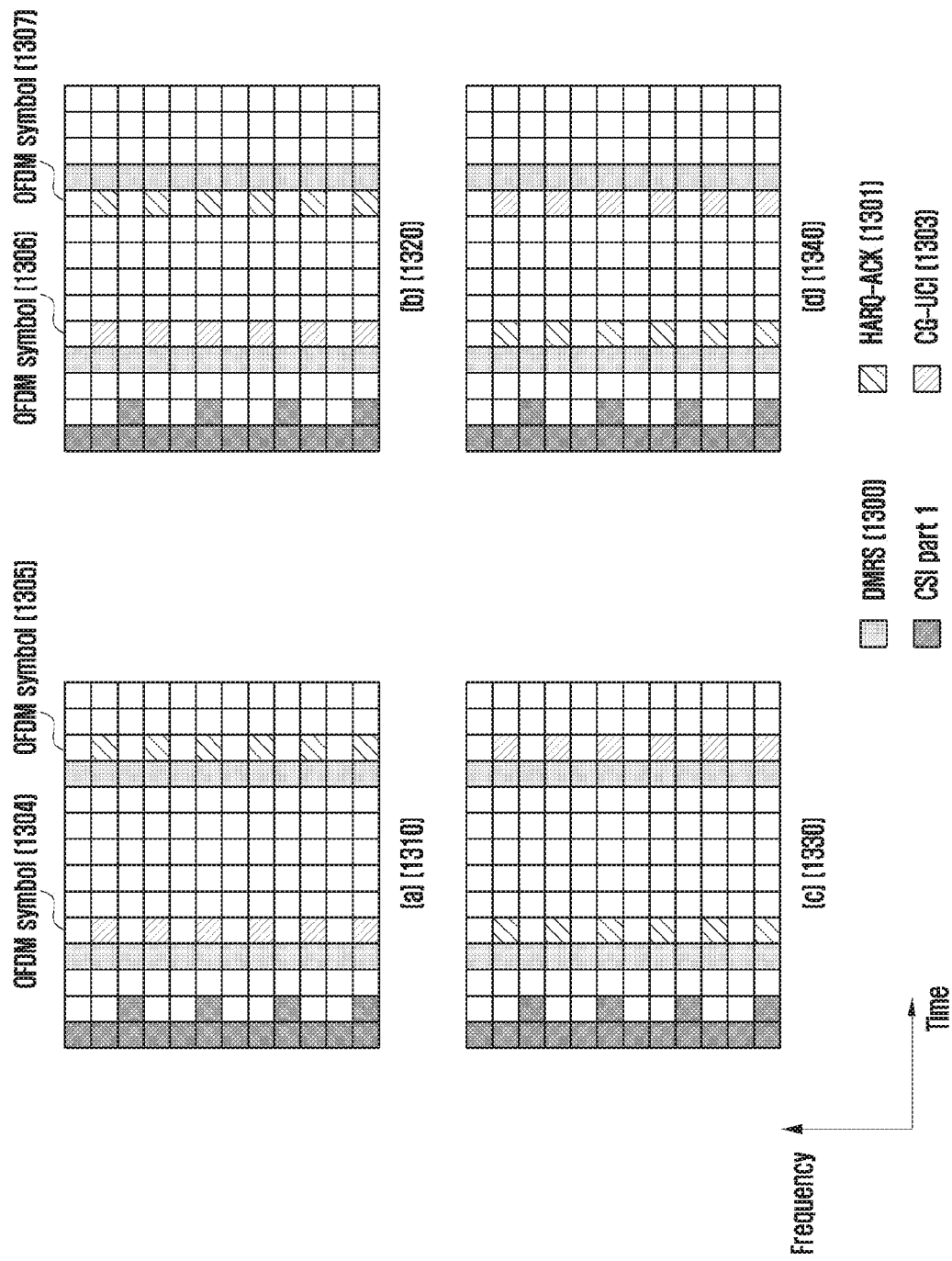
FIG. 13 is a diagram illustrating an example of mapping CG-UCI according to an embodiment of the disclosure.

FIG. 13 is a diagram illustrating another example of mapping CG-UCI according to an embodiment of the disclosure.

Referring to FIG. 13, after deciding and determining the priority of uplink control information in the above-described manner, a UE may add the uplink control information to CG-PUSCH. If the UE decides or determines CG-UCI 1303 to be uplink control information having the highest priority, the UE may first map the CG-UCI 1303 to the CG-PUSCH on the basis of the aforementioned multiplexing rule of HARQ-ACK, as shown in part (a) of FIG. 13 (1310). In part (a) of FIG. 13 (1310), the UE may map the CG-UCI to the CG-PUSCH from a first OFDM symbol 1304 that does not include a DMRS after a first DMRS symbol 1300. Subsequently, the UE may map HARQ-ACK to the CG-PUSCH on the basis of the multiplexing rule of HARQ-ACK from a first OFDM symbol 1305 that does not include a DMRS after a second DMRS (or a last DMRS) symbol 1300. As another method, as shown in part (b) of FIG. 13 (1320), the UE may map the HARQ-ACK to the CG-PUSCH on the basis of the multiplexing rule of HARQ-ACK from a first OFDM symbol 1307 that does not include a DMRS before the second DMRS (or the last DMRS) symbol.

If the UE decides or determines HARQ-ACK to be the uplink control information having the highest priority, it may be possible for the UE to map the uplink control information to the CG-PUSCH in the same manner described above, as shown in part (c) of FIG. 13 (1330) or part (d) of FIG. 13 (1340).

4-5th Embodiment

Figure 14:
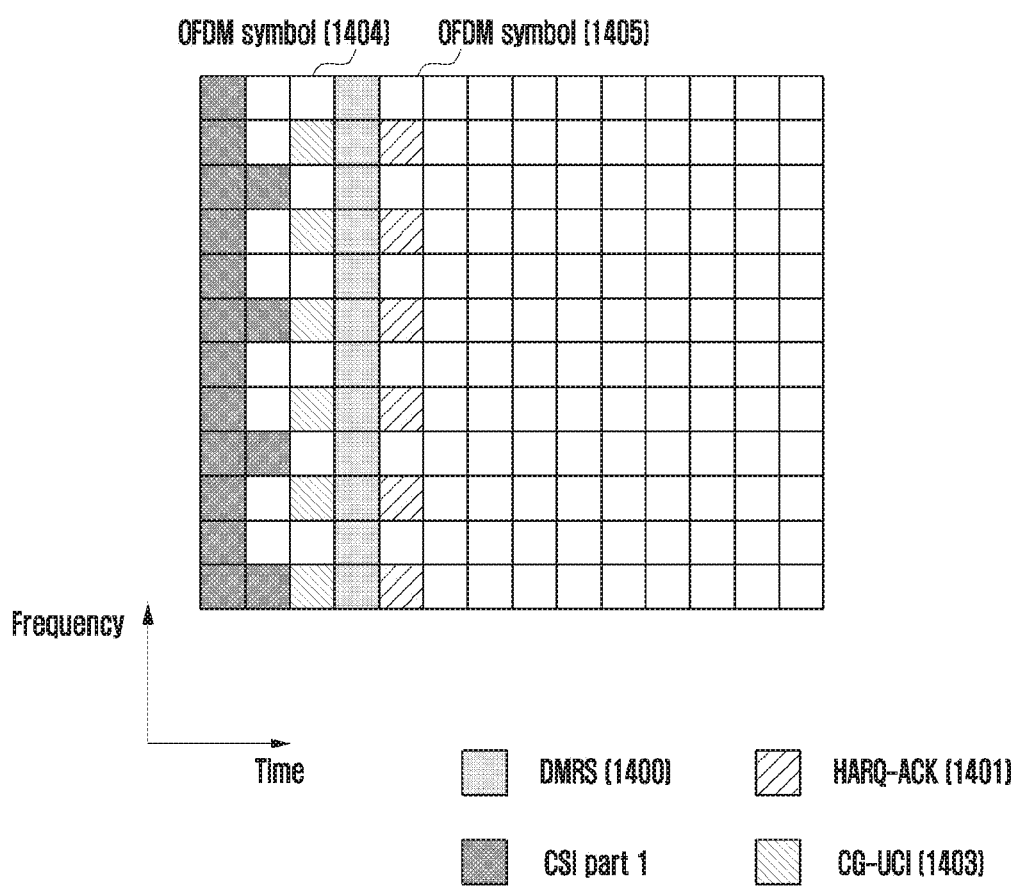
FIG. 14 is a diagram illustrating an example of mapping CG-UCI according to an embodiment of the disclosure.

FIG. 14 is a diagram illustrating another example of mapping CG-UCI according to an embodiment of the disclosure.

Referring to FIG. 14, after deciding and determining the priority of uplink control information in the above-described manner, a UE may add the uplink control information to CG-PUSCH.

Referring to FIG. 14, if the UE decides or determines CG-UCI to be uplink control information having the highest priority, the UE may map CG-UCI 1403 to the CG-PUSCH according to the same rule as that of the aforementioned HARQ-ACK multiplexing method from a first OFDM symbol 1404 that does not include a DMRS before a first DMRS symbol 1400. The UE may map HARQ-ACK 1401 to the CG-PUSCH on the basis of the aforementioned multiplexing rule of HARQ-ACK with respect to an RE to which the CG-UCI is not mapped, from a first OFDM symbol 1405 that does not include a DMRS after a DMRS symbol. If the UE decides or determines HARQ-ACK to be uplink control information having the highest priority, the UE may first map the HARQ-ACK 1401 to the CG-PUSCH in the same manner as that of the aforementioned HARQ-ACK multiplexing, and then, with respect to an RE to which the HARQ-ACK is not mapped, the UE may map the CG-UCI 1403 to the CG-PUSCH with respect to the RE to which the HARQ-ACK 1401 is not mapped, in the manner described in the embodiment.

4-6th Embodiment

Figure 15:
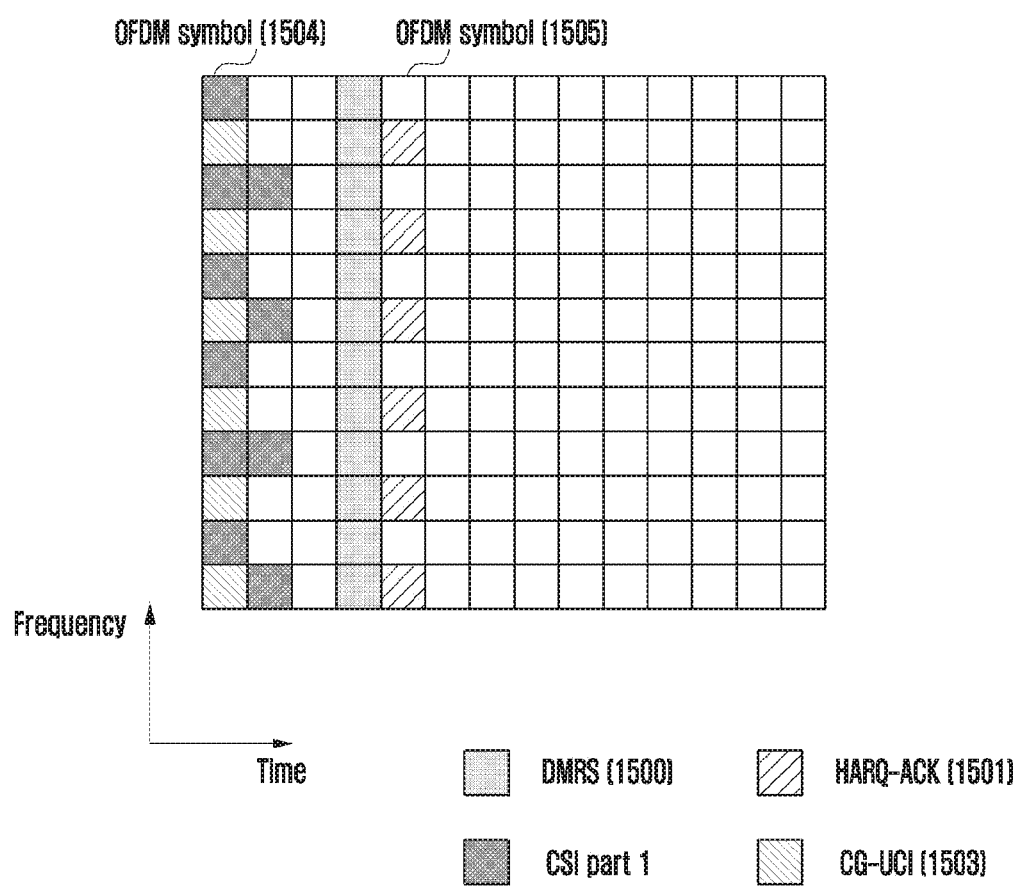
FIG. 15 is a diagram illustrating an example of mapping CG-UCI according to an embodiment of the disclosure.

FIG. 15 is a diagram illustrating another example of mapping CG-UCI according to an embodiment of the disclosure.

Referring to FIG. 15, after deciding and determining the priority of uplink control information in the above-described manner, a UE may add the uplink control information to CG-PUSCH.

Referring to FIG. 15, if the UE decides (or determines) CG-UCI to be uplink control information having the highest priority, the UE may map CG-UCI 1503 to the CG-PUSCH according to the same rule as that of the aforementioned HARQ-ACK multiplexing method from a first OFDM symbol 1504 that is not a DMRS. Subsequently, the UE may map HARQ-ACK 1501 to the CG-PUSCH on the basis of the aforementioned HARQ-ACK multiplexing rule with respect to an RE to which CG-UCI is not mapped, from a first OFDM symbol 1505 that does not include a DMRS after a DMRS symbol 1500. Then, the UE may map CSI-part1 1502 to the CG-PUSCH according to the same rule as that of the aforementioned CSI-part1 multiplexing method with respect to an RE to which the CG-UCI 1503 and HARQ-ACK 1501 are not mapped, from the first OFDM symbol 1504 that is not DMRS. If the UE decides or determines HARQ-ACK to be uplink control information having the highest priority, the UE may first map the HARQ-ACK 1501 to the CG-PUSCH in the same manner as that of the aforementioned HARQ-ACK multiplexing, and then, with respect to an RE to which the HARQ-ACK is not mapped, the UE may map the CG-UCI to the CG-PUSCH with respect to the RE to which the HARQ-ACK is not mapped, in the manner described in the embodiment.

Embodiment 5

The fifth embodiment proposes, in relation to a base station and a UE which operate in an unlicensed band, a method of mapping uplink control information generated by the UE to an uplink data channel. More specifically, the fifth embodiment proposes a method and device, in which, when the UE generates uplink control information by using joint encoding on the basis of information configured or indicated by the base station, the UE maps the uplink control information to CG-PUSCH.

Figure 16:
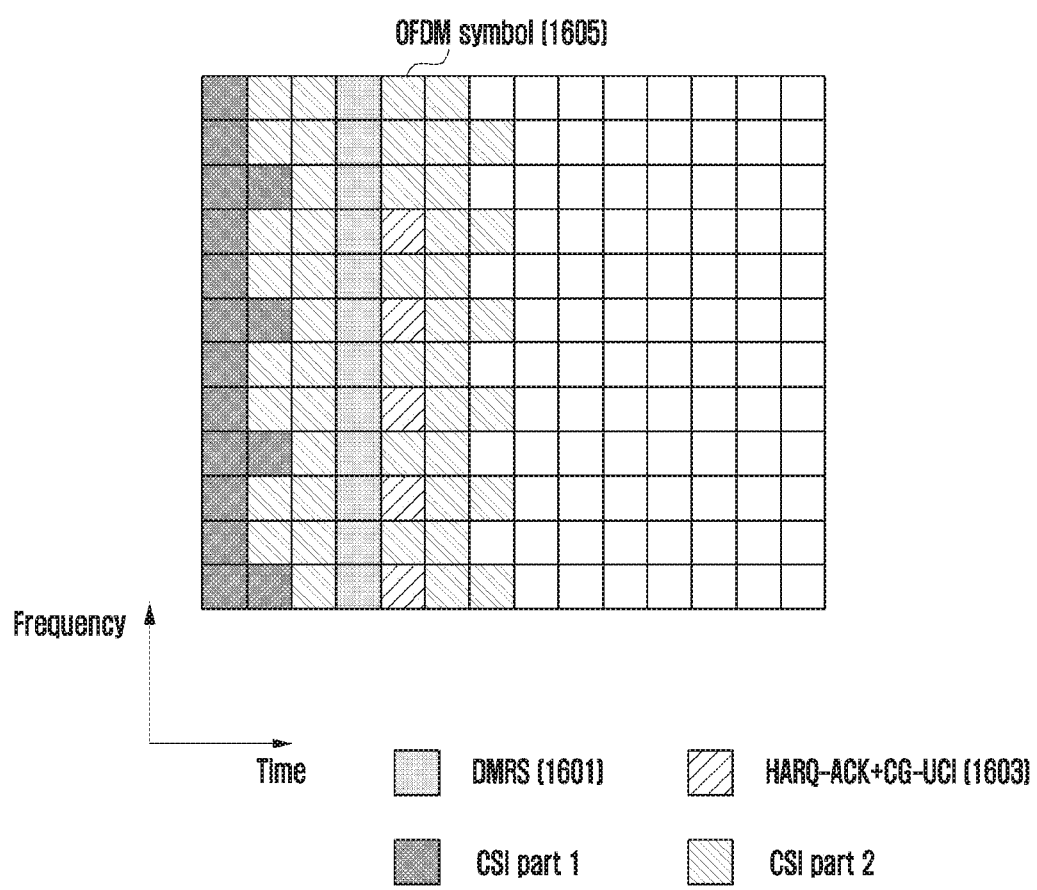
FIG. 16 is a diagram illustrating an example of mapping CG-UCI according to an embodiment of the disclosure.

FIG. 16 is a diagram illustrating an example of mapping CG-UCI according to an embodiment of the disclosure.

Referring to FIG. 16, if a UE performs joint encoding for CG-UCI and HARQ-ACK, and then joint-encoded uplink control information is included in CG-PUSCH, the UE may add the joint-encoded uplink control information to the CG-PUSCH on the basis of the aforementioned multiplexing rule of HARQ-ACK.

More specifically, the UE may map the joint-encoded uplink control information 1603 to the CG-PUSCH from a first OFDM symbol 1605 that does not include a DMRS after a first DMRS symbol 1601. RE spacing between uplink control information symbols on the frequency axis may be determined in the same manner as described above.

Embodiment 6

The sixth embodiment proposes, in relation to a base station and a UE which operate in an unlicensed band, a method of mapping uplink control information generated by the UE to an uplink data channel.

Figure 17:
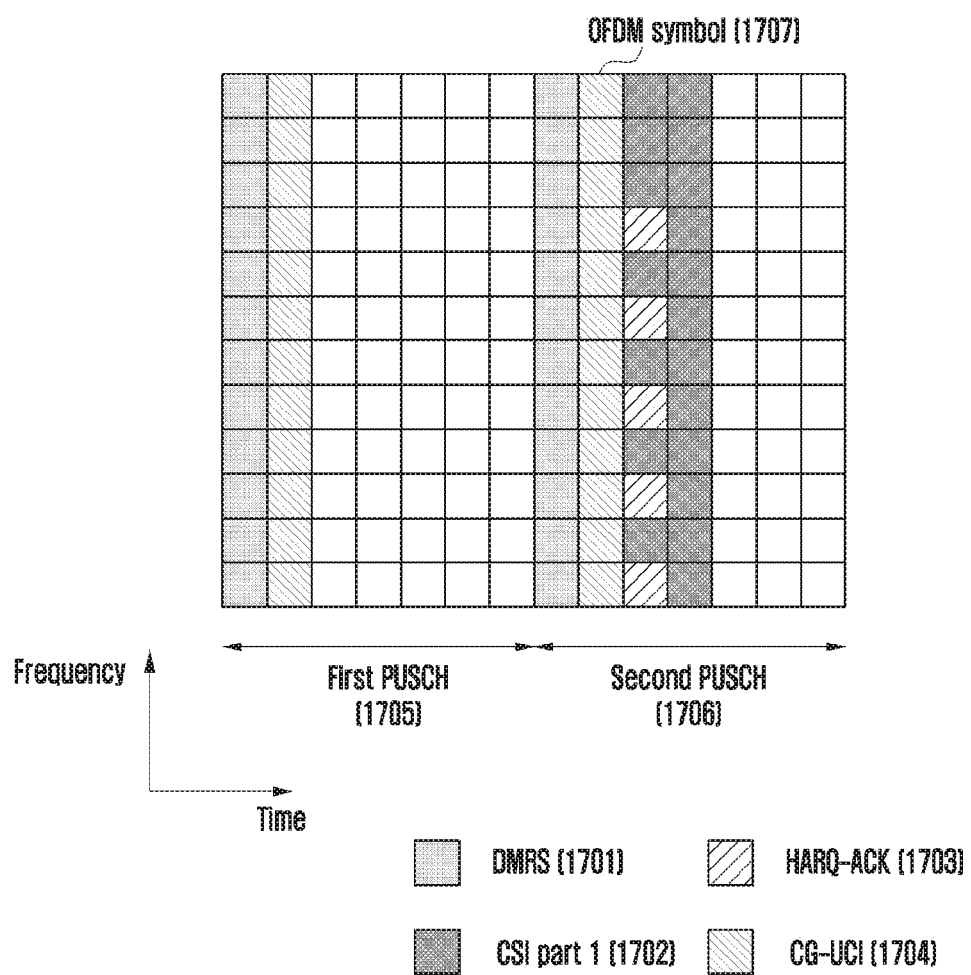
FIG. 17 is a diagram illustrating an example of mapping UCI according to an embodiment of the disclosure.

FIG. 17 is a diagram illustrating an example of mapping UCI according to an embodiment of the disclosure.

Referring to FIG. 17, it is assumed that a UE is configured or scheduled, by a base station, to transmit multiple CG-PUSCHs 1705, 1706 in one slot. If an uplink control channel to be transmitted by the UE overlaps with the multiple CG-PUSCHs 1705, 1706 in one slot, the UE may add the existing uplink control information (e.g., HARQ-ACK 1703, CSI part1 1702, and CSI part2) to a last CG-PUSCH 1706 overlapping with the uplink control channel, so as to transmit the same. CG-UCI 1704 may be mapped to a first OFDM symbol 1707 that does not include a DMRS after a first DMRS symbol 1701. A method of configuring or generating uplink control information that is to be included in the last CG-PUSCH 1706 may include application of the above-described schemes or a combination thereof.

Figure 18:
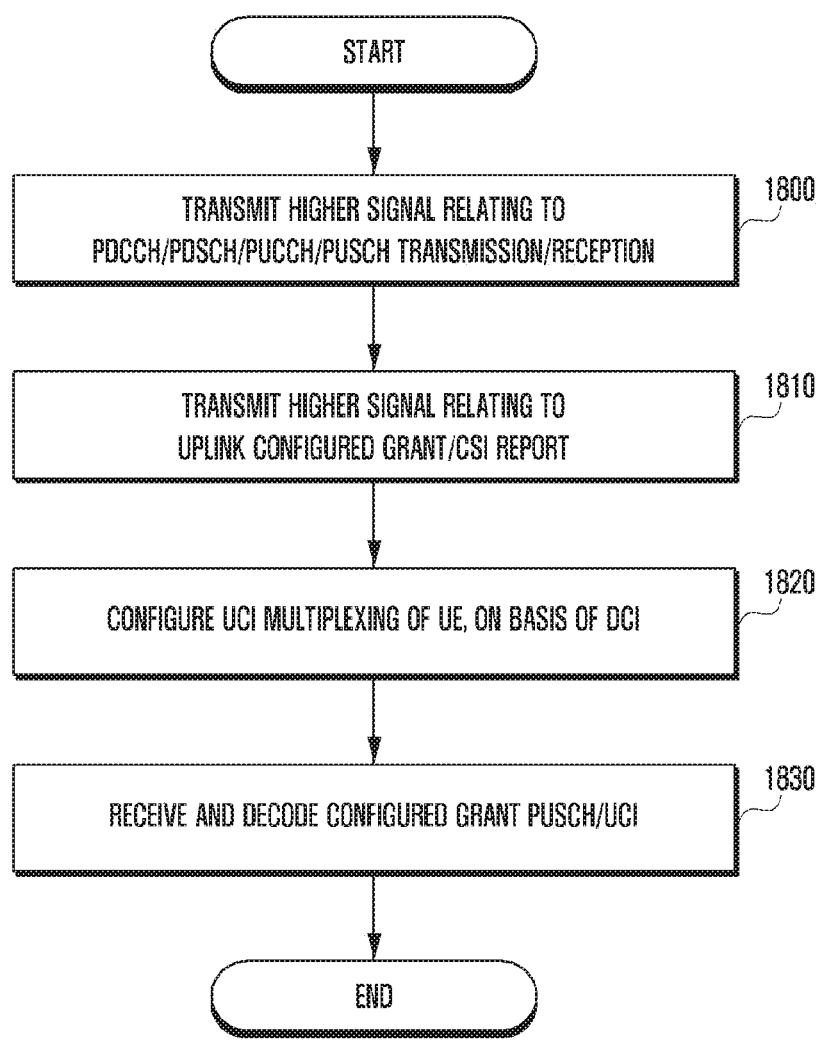
FIG. 18 is a flow chart illustrating operations of a base station according to an embodiment of the disclosure.

FIG. 18 is a diagram illustrating operations of a base station according to an embodiment of the disclosure.

Referring to FIG. 18, a base station may transmit configurations relating to PDCCH, PDSCH, PUCCH, and PUSCH transmission/reception to a UE via a higher signal in operation 1800. For example, the base station may transmit a PDCCH resource area for reception of downlink or uplink scheduling information, a CORESET configuration, a search space configuration, or the like to the UE via a higher signal. The base station may transmit configurations relating to PDSCH/PUSCH transmission/reception, which include offset information between a PDCCH reception slot and a PDSCH reception slot or a PUSCH transmission slot, information on the number of repeated transmissions of PDSCH or PUSCH, etc., to the UE via a higher signal. In operation 1810, the base station may additionally transmit configured grant-related configuration information, such as a configured grant transmission period and offset information. In operation 1810, the base station may additionally transmit CSI reporting-related configuration information, such as a resource for CSI reporting, a reporting method, and a reporting period. The configured grant and CSI reporting configuration information transmitted to the UE in operation 1810 can be also transmitted in operation 1800.

In operation 1820, the base station may indicate necessary information, such as a CSI reporting scheme, to the UE by using downlink control information when UCI is included in CG-PUSCH. In operation 1830, the base station may receive and decode the CG-PUSCH and uplink control information included in the CG-PUSCH on the basis of information configured to the UE by the base station.

Figure 19:
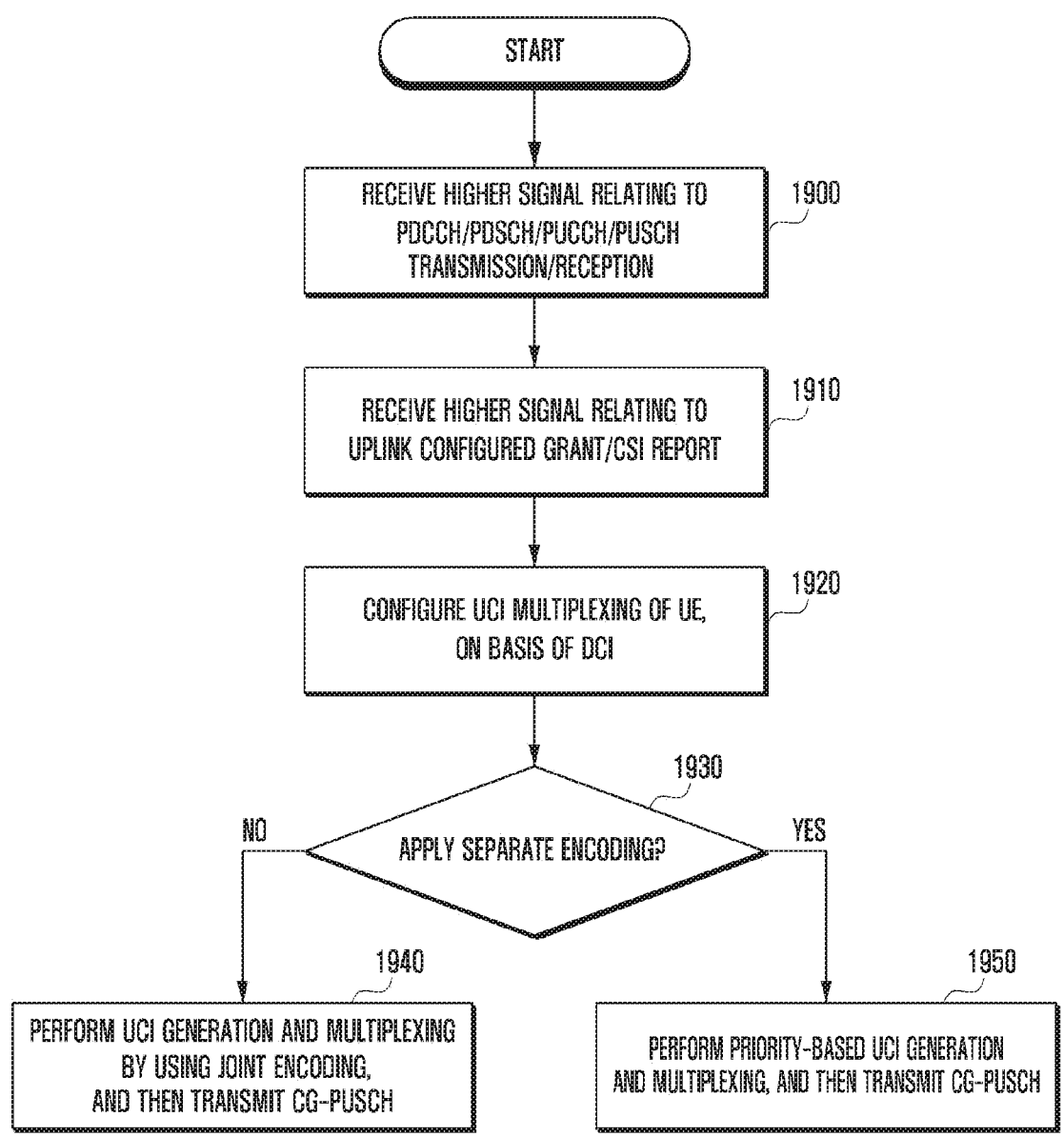
FIG. 19 is a flow chart illustrating operations of a user equipment (UE) according to an embodiment of the disclosure.

FIG. 19 is a diagram illustrating operations of a UE according to an embodiment of the disclosure.

Referring to FIG. 19, in operation 1900, a UE receives configurations relating to PDCCH, PDSCH, PUCCH, and PUSCH transmission/reception from a base station via a higher signal, and perform configuration relating to the PDCCH, PDSCH, PUCCH, and PUSCH transmission/reception according to the received configuration information. For example, the UE may receive a PDCCH resource area for reception of downlink or uplink scheduling information, a CORESET configuration, a search space configuration, or the like from the base station via a higher signal. In operation 1910, the UE may additionally receive configured grant-related configuration information, such as a configured grant transmission period and offset information. In operation 1910, the UE may additionally receive CSI reporting-related configuration information, such as a resource for CSI reporting, a reporting method, and a reporting period. The configured grant-related configuration information and the CSI reporting-related configuration information in operation 1910 can be also included in higher signal configuration information transmitted in operation 1900. In operation 1920, the UE may receive downlink control information so as to receive necessary information, such as a CSI reporting scheme, from the base station when a CG-PUSCH includes UCI.

In operation 1930, the UE determines whether to apply separate encoding. If the UE determines, in operation 1930, not to generate UCI to be included in the CG-PUSCH on the basis of separate encoding, the UE may generate the UCI by using joint encoding and then multiplex the UCI to the CG-PUSCH so as to transmit the CG-PUSCH, in operation 1940. If the UE determines, in operation 1930, to generate the UCI to be included in the CG-PUSCH on the basis of separate encoding, the UE may generate the UCI by using separate encoding, multiplex the UCI to the CG-PUSCH on the basis of the priority of the UCI, which is configured by the base station, and then transmit the CG-PUSCH in operation 1950.

Referring to FIG. 19, the UE determines whether to perform separate encoding. However, whether to perform separate encoding or to perform joint encoding may be determined in advance or may be configured by the base station, and in this case, operation 1930 may be omitted.

Figure 20:
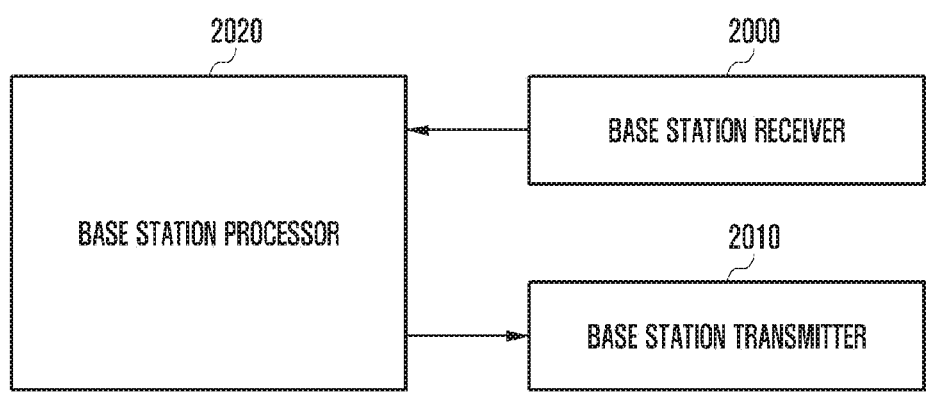
FIG. 20 is a block diagram illustrating a structure of a base station according to an embodiment of the disclosure.

FIG. 20 is a block diagram illustrating an internal structure of a base station according to an embodiment of the disclosure.

Referring to FIG. 20, the base station according to an embodiment of the disclosure may include a base station receiver 2000, a base station transmitter 2010, a base station processor 2020. The base station receiver 2000 and the base station transmitter 2010 may collectively be referred to as a transceiver. The transceiver may transmit a signal to or receive a signal from a UE. The signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. Further, the transceiver may receive a signal via a radio channel, may output the signal to the base station processor 2020, and may transmit the signal output from the base station processor 2020 via the radio channel. The base station processor 2020 may control a series of procedures so that the base station operates according to the above-described embodiment of the disclosure. Further, the base station processor 2020 may perform a channel access procedure for an unlicensed band. The base station receiver 2020 may receive signals transmitted via an unlicensed band, and the base station processor 2020 may determine whether the unlicensed band is in an idle state by comparing an intensity of the received signal with a predetermined threshold value of a function which is predefined or takes a bandwidth, etc. as parameters. The base station processor 2020 may determine, change, or reconfigure a multiplexing scheme of UCI to be received by the base station, and a signal including information indicating the multiplexing scheme may be transmitted by the base station transmitter 2010 via a downlink control channel or a data channel.

Figure 21:
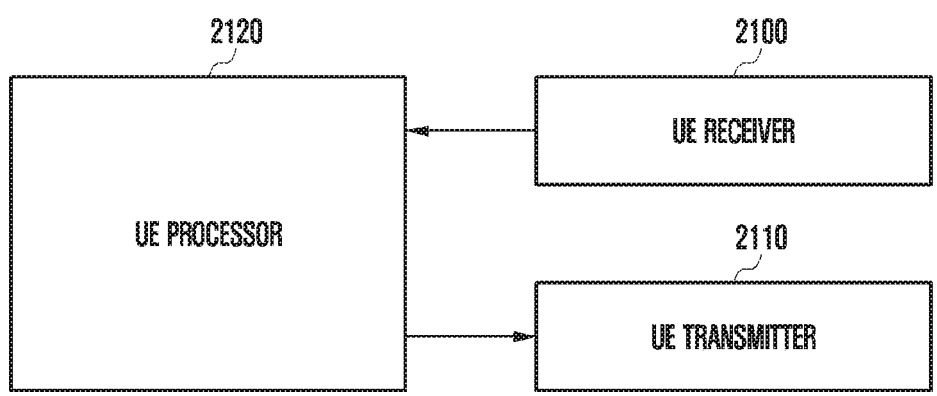
FIG. 21 is a block diagram illustrating a structure of a UE according to an embodiment of the disclosure.

FIG. 21 is a block diagram illustrating an internal structure of a UE according to an embodiment of the disclosure.

Referring to FIG. 21, the UE of the disclosure may include a UE receiver 2100, a UE transmitter 2110, and a UE processor 2120. The UE receiver 2100 and the UE transmitter 2110 may collectively be referred to as a transceiver in the embodiment. The transceiver may transmit a signal to or receive a signal from the base station. The signal may include control information and data. To this end, the transceiver may include an RF transmitter configured to perform up-conversion and amplification of a frequency of a transmitted signal, an RF receiver configured to perform low-noise amplification of a received signal and down-converting a frequency of the received signal, and the like. Further, the transceiver may receive a signal via a radio channel, may output the signal to a UE processor 2120, and may transmit the signal output from the UE processor 2120, via the radio channel. The UE processor 2120 may control a series of procedures so that the UE operates according to the above-described embodiment. For example, the UE receiver 2100 may receive a data signal including a control signal, and the UE processor 2120 may determine a reception result for the data signal. Thereafter, when the signal reception result including the data reception is to be transmitted to the base station at the timing, the UE transmitter 2110 transmits the signal reception result to the base station at a timing determined by the processor. For another example, when the UE receiver 2100 receives, from the base station, configuration information on a method for generating and multiplexing UCI that is to be included in a CG-PUSCH so as to be transmitted, the UE processor 2120 may accordingly generate UCI and add the UCI to the CG-PUSCH, and the UE transmitter 211 may transmit an uplink data signal including uplink control information.

The above respective embodiments may be employed in combination, as necessary. For example, the methods proposed in the disclosure may be partially combined to operate a base station and a terminal. Further, although the above embodiments have been described by way of the 5G and NR systems, other variants based on the technical idea of the embodiments may be implemented in other systems such as LTE, LTE-A, LTE-A-Pro, and V2X systems.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
receiving, from a base station, configuration information on a configured grant for a physical uplink shared channel (PUSCH) by higher layer signaling;

identifying a number of uplink control information (UCI) payloads to be joint-encoded configured by higher layer signaling;

identifying whether a joint-encoding of hybrid automatic repeat acknowledgement (HARQ-ACK) information and configured grant uplink control information (CG-UCI) is configured or not based on the number of UCI payloads to be joint-encoded, wherein the HARQ-ACK information includes first HARQ-ACK information having a higher priority for a first service type and second HARQ-ACK information having a lower priority for a second service type;

in case that the joint-encoding of the HARQ-ACK information and the CG-UCI is configured and the HARQ-ACK information overlaps with a PUSCH transmission configured by the configuration information, performing the joint-encoding of the first HARQ-ACK information and the CG-UCI;

transmitting, to the base station, uplink data including the joint-encoded first HARQ-ACK information and CG-UCI via the PUSCH configured by the configuration information, wherein the second HARQ-ACK information is dropped; and in case that the joint-encoding of the HARQ-ACK information and the CG-UCI is not configured and the HARQ-ACK information overlaps with the PUSCH transmission configured by the configuration information, transmitting, to the base station, the HARQ-ACK information via a physical uplink control channel (PUCCH) and skipping to transmit the PUSCH configured by the configuration information.

2. The method of claim 1, further comprising:
in case that the joint-encoding of the HARQ-ACK information and the CG-UCI is configured and the HARQ-ACK information overlaps with the PUSCH transmission configured by the configuration information, skipping to transmit the PUCCH for the HARQ-ACK information.

3. The method of claim 1, wherein the joint-encoded first HARQ-ACK information and CG-UCI is mapped on resource elements included in at least one orthogonal frequency division multiplexing (OFDM) symbols starting from a first OFDM symbol after a first OFDM symbol carrying a demodulation reference signal (DMRS) for the PUSCH.

4. The method of claim 1, wherein a channel state information (CSI) part 1 and a CSI part 2 are encoded separately and multiplexed in the PUSCH.

5. A method performed by a base station in a communication system, the method comprising:
transmitting, to a terminal, configuration information on a configured grant for a physical uplink shared channel (PUSCH) by higher layer signaling;
transmitting, to the terminal, a number of uplink control information (UCI) payloads to be joint-encoded configured by higher layer signaling;
in case that a joint-encoding of hybrid automatic repeat acknowledgement (HARQ-ACK) information and configured grant uplink control information (CG-UCI) is configured by the number of UCI payloads to be joint-encoded, the HARQ-ACK information overlaps with a PUSCH transmission configured by the configuration information, and the HARQ-ACK information includes first HARQ-ACK information having a higher priority for a first service type and second HARQ-ACK information having a lower priority for a second service type:

receiving, from the terminal, uplink data including joint-encoded first HARQ-ACK information and CG-UCI via the PUSCH configured by the configuration information, and performing decoding of the joint-encoded first HARQ-ACK information and CG-UCI, wherein the second HARQ-ACK information is dropped; and in case that the joint-encoding of the HARQ-ACK information and the CG-UCI is not configured by the number of UCI payloads to be joint-encoded and the HARQ-ACK information overlaps with the PUSCH transmission configured by the configuration information, receiving, from the terminal, the HARQ-ACK information on a physical uplink control channel (PUCCH), wherein the PUSCH configured by the configuration information is not received by the base station.

6. The method of claim 5, wherein, in case that the joint-encoding of the HARQ-ACK information and the CG-UCI is configured by the number of UCI payloads to be joint-encoded and the HARQ-ACK information overlaps with the PUSCH transmission configured by the configuration information, the PUCCH for the HARQ-ACK information is not received by the base station.

7. The method of claim 5, wherein the joint-encoded first HARQ-ACK information and CG-UCI is mapped on resource elements included in at least one orthogonal frequency division multiplexing (OFDM) symbols starting from a first OFDM symbol after a first OFDM symbol carrying a demodulation reference signal (DMRS) for the PUSCH.

8. The method of claim 5, wherein a channel state information (CSI) part 1 and a CSI part 2 are received via the PUSCH and decoded separately.

9. A terminal in a communication system, the terminal comprising:
a transceiver; and
a processor coupled with the transceiver and configured to:
receive, from a base station, configuration information on a configured grant for a physical uplink shared channel (PUSCH) by higher layer signaling,
identify a number of uplink control information (UCI) payloads to be joint-encoded configured by higher layer signaling,
identify whether a joint-encoding of hybrid automatic repeat acknowledgement (HARQ-ACK) information and configured grant uplink control information (CG-UCI) is configured or not based on the number of UCI payloads to be joint-encoded, wherein the HARQ-ACK information includes first HARQ-ACK information having a higher priority for a first service type and second HARQ-ACK information having a lower priority for a second service type,
in case that the joint-encoding of the HARQ-ACK information and the CG-UCI is configured and the HARQ-ACK information overlaps with a PUSCH transmission configured by the configuration information, perform the joint-encoding of the first HARQ-ACK information and the CG-UCI, transmit, to the base station, uplink data including the joint-encoded first HARQ-ACK information and CG-UCI via the PUSCH configured by the configuration information, wherein the second HARQ-ACK information is dropped, and
in case that the joint-encoding of the HARQ-ACK information and the CG-UCI is not configured and the HARQ-ACK information overlaps with the PUSCH transmission configured by the configuration information, transmit, to the base station, the HARQ-ACK information via a physical uplink control channel (PUCCH) and skip to transmit the PUSCH configured by the configuration information.

10. The terminal of claim 9, wherein, in case that the joint-encoding of the HARQ-ACK information and the CG-UCI is configured and the HARQ-ACK information overlaps with the PUSCH transmission configured by the configuration information, the processor is further configured to skip to transmit the PUCCH for the HARQ-ACK information.

11. The terminal of claim 9, wherein the joint-encoded first HARQ-ACK information and CG-UCI is mapped on resource elements included in at least one orthogonal frequency division multiplexing (OFDM) symbols starting from a first OFDM symbol after a first OFDM symbol carrying a demodulation reference signal (DMRS) for the PUSCH.

12. The terminal of claim 9, wherein a channel state information (CSI) part 1 and a CSI part 2 are encoded separately and multiplexed in the PUSCH.

13. A base station in a communication system, the base station comprising:
a transceiver; and
a processor coupled with the transceiver and configured to:
transmit, to a terminal, configuration information on a configured grant for a physical uplink shared channel (PUSCH) by higher layer signaling,
transmit, to the terminal, a number of uplink control information (UCI) payloads to be joint-encoded configured by higher layer signaling,
in case that a joint-encoding of hybrid automatic repeat acknowledgement (HARQ-ACK) information and configured grant uplink control information (CG-UCI) is configured by the number of UCI payloads to be joint-encoded, the HARQ-ACK information overlaps with a PUSCH transmission configured by the configuration information, and the HARQ-ACK information includes first HARQ-ACK information having a higher priority for a first service type and second HARQ-ACK information having a lower priority for a second service type:
receive, from the terminal, uplink data including joint-encoded first HARQ-ACK information and CG-UCI via the PUSCH configured by the configuration information, and
perform decoding of the joint-encoded first HARQ-ACK information and CG-UCI, wherein the second HARQ-ACK information is dropped, and
in case that the joint-encoding of the HARQ-ACK information and the CG-UCI is not configured by the number of UCI payloads to be joint-encoded and the HARQ-ACK information overlaps with the PUSCH transmission configured by the configuration information, receive, from the terminal, the HARQ-ACK information on a physical uplink control channel (PUCCH),
wherein the PUSCH configured by the configuration information is not received by the base station.

14. The base station of claim 13, wherein, in case that the joint-encoding of the HARQ-ACK information and the CG-UCI is configured by the number of UCI payloads to be joint-encoded, the PUCCH for the HARQ-ACK information is not received by the base station.

15. The base station of claim 13, wherein the joint-encoded first HARQ-ACK information and CG-UCI is mapped on resource elements included in at least one orthogonal frequency division multiplexing (OFDM) symbols starting from a first OFDM symbol after a first OFDM symbol carrying a demodulation reference signal (DMRS) for the PUSCH.

16. The base station of claim 13, wherein a channel state information (CSI) part 1 and a CSI part 2 are received via the PUSCH and decoded separately.

* * * * *